(12) United States Patent
Zhu et al.

(10) Patent No.: US 12,505,618 B2
(45) Date of Patent: Dec. 23, 2025

(54) MANHATTAN LAYOUT ESTIMATION USING GEOMETRIC AND SEMANTIC INFORMATION

(71) Applicant: Tencent America LLC, Palo Alto, CA (US)

(72) Inventors: Haichao Zhu, Los Angeles, CA (US); Bing Jian, Cupertino, CA (US); Weiwei Feng, Mountain View, CA (US); Lu He, Palo Alto, CA (US); Kelin Liu, Thornhill (CA); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 406 days.

(21) Appl. No.: 17/981,156

(22) Filed: Nov. 4, 2022

(65) Prior Publication Data
US 2023/0245390 A1    Aug. 3, 2023

Related U.S. Application Data

(60) Provisional application No. 63/306,001, filed on Feb. 2, 2022.

(51) Int. Cl.
*G06T 17/20*  (2006.01)
*G06T 7/33*   (2017.01)
(Continued)

(52) U.S. Cl.
CPC .............. *G06T 17/20* (2013.01); *G06T 7/33* (2017.01); *G06T 7/55* (2017.01); *G06T 7/60* (2013.01);
(Continued)

(58) Field of Classification Search
CPC ...... G06V 20/70; G06V 10/764; G06T 17/20; G06T 7/55; G06T 7/33; G06T 7/60; G06T 11/203; G06T 15/06
See application file for complete search history.

(56) References Cited

U.S. PATENT DOCUMENTS 7,302,359 B2 * 11/2007 McKitterick ...... G01C 21/3848
                                                            702/155
10,026,218 B1 * 7/2018 Mertens ............... H04N 13/332
(Continued)

FOREIGN PATENT DOCUMENTS

JP        2022-501684 A      1/2022

OTHER PUBLICATIONS

Zou, Chuhang, et al. "Layoutnet: Reconstructing the 3d room layout from a single rgb image." Proceedings of the IEEE conference on computer vision and pattern recognition. 2018. (Year: 2018).*

(Continued)

*Primary Examiner* — Charles L Beard
(74) *Attorney, Agent, or Firm* — ArentFox Schiff LLP

(57) ABSTRACT

A plurality of two-dimensional (2D) images of the scene is received. Geometric information and semantic information of each of the plurality of 2D images is determined. The geometric information indicates a detected line and a reference direction in the respective 2D image. The semantic information includes classification information of pixels in the respective 2D image. A layout estimation associated with the respective 2D image of the scene is determined based on the geometric information and the semantic information of the respective 2D image. A combined layout estimation associated with the scene is determined based on a plurality of the determined layout estimations associated with the plurality of 2D images of the scene. The Manhattan layout associated with the scene is generated based on the combined layout estimation. The Manhattan layout includes at (Continued)

least a three-dimensional (3D) shape of the scene that includes wall faces orthogonal with respect to each other.

20 Claims, 15 Drawing Sheets

(51) Int. Cl.
*G06T 7/55* (2017.01)
*G06T 7/60* (2017.01)
*G06T 11/20* (2006.01)
*G06T 15/06* (2011.01)
*G06V 10/764* (2022.01)
*G06V 20/70* (2022.01)

(52) U.S. Cl.
CPC ............ *G06T 11/203* (2013.01); *G06T 15/06* (2013.01); *G06V 10/764* (2022.01); *G06V 20/70* (2022.01)

(56) References Cited

U.S. PATENT DOCUMENTS

| | | | | |
|---|---|---|---|---|
| 10,809,066 | B2* | 10/2020 | Colburn | G06V 20/20 |
| 11,004,202 | B2* | 5/2021 | Tchapmi | G06N 3/045 |
| 11,087,479 | B1* | 8/2021 | Geraghty | G06T 19/006 |
| 11,164,368 | B2* | 11/2021 | Vincent | G06T 17/05 |
| 11,188,787 | B1* | 11/2021 | Ulbricht | G06V 10/7715 |
| 11,252,329 | B1* | 2/2022 | Cier | H04N 23/53 |
| 11,274,929 | B1* | 3/2022 | Afrouzi | G06T 7/30 |
| 11,393,114 | B1* | 7/2022 | Ebrahimi Afrouzi | G01C 11/02 |
| 11,481,925 | B1* | 10/2022 | Li | G06T 7/75 |
| 11,481,970 | B1* | 10/2022 | Mertens | G06T 7/0002 |
| 11,501,492 | B1* | 11/2022 | Li | G06T 7/55 |
| 11,507,713 | B2* | 11/2022 | Tran | G06F 30/13 |
| 11,514,633 | B1* | 11/2022 | Çetintaş | G06T 11/203 |
| 11,561,102 | B1* | 1/2023 | Ebrahimi Afrouzi | G05D 1/0272 |
| 11,600,049 | B2* | 3/2023 | Chen | G06T 19/006 |
| 11,830,135 | B1* | 11/2023 | Khosravan | G06Q 90/20 |
| 11,989,834 | B1* | 5/2024 | Agarwal | G06T 19/20 |
| 12,140,419 | B2* | 11/2024 | Pershing | G01B 21/28 |
| 12,147,239 | B2* | 11/2024 | Lai | G05D 1/243 |
| 12,175,562 | B2* | 12/2024 | Hutchcroft | G06T 7/60 |
| 12,190,581 | B2* | 1/2025 | Stoeva | G06T 19/006 |
| 2004/0196480 | A1* | 10/2004 | Foster | H04N 1/4076 358/1.9 |
| 2006/0053399 | A1* | 3/2006 | Honda | G06F 30/39 716/135 |
| 2007/0185681 | A1* | 8/2007 | McKitterick | G01C 21/3848 702/159 |
| 2013/0259308 | A1* | 10/2013 | Klusza | G06T 19/00 382/103 |
| 2014/0301633 | A1* | 10/2014 | Furukawa | G06T 17/00 382/154 |
| 2015/0116509 | A1* | 4/2015 | Birkler | H04N 1/00244 348/207.1 |
| 2015/0228095 | A1* | 8/2015 | Chen | G06T 11/206 345/440 |
| 2015/0286893 | A1* | 10/2015 | Straub | G06V 10/243 382/154 |
| 2016/0110916 | A1* | 4/2016 | Eikhoff | G06T 17/20 345/420 |
| 2018/0032643 | A1* | 2/2018 | Wright | G06F 30/18 |
| 2018/0046733 | A1* | 2/2018 | Wong | G06T 17/00 |
| 2018/0149481 | A1* | 5/2018 | Hirai | G06T 19/003 |
| 2018/0268220 | A1* | 9/2018 | Lee | G06V 10/454 |
| 2018/0315162 | A1* | 11/2018 | Sturm | H04N 13/239 |
| 2018/0330184 | A1* | 11/2018 | Mehr | G06T 17/00 |
| 2018/0374225 | A1* | 12/2018 | Edge | G06F 40/106 |
| 2019/0120633 | A1* | 4/2019 | Afrouzi | G01S 7/4808 |
| 2019/0205485 | A1* | 7/2019 | Rejeb Sfar | G06F 30/13 |
| 2019/0243928 | A1* | 8/2019 | Rejeb Sfar | G06F 18/2413 |
| 2019/0266293 | A1* | 8/2019 | Ishida | G06T 7/60 |
| 2020/0007841 | A1* | 1/2020 | Sedeffow | H04N 13/117 |
| 2020/0082198 | A1* | 3/2020 | Yao | G06V 10/955 |
| 2020/0211284 | A1* | 7/2020 | Lin | G06T 17/00 |
| 2020/0312013 | A1* | 10/2020 | Dougherty | G06V 20/64 |
| 2020/0394849 | A1* | 12/2020 | Barker | G06V 10/764 |
| 2021/0049784 | A1* | 2/2021 | Török | G06T 7/60 |
| 2021/0064216 | A1* | 3/2021 | Li | G06T 11/00 |
| 2021/0073449 | A1* | 3/2021 | Segev | G06F 30/27 |
| 2021/0125397 | A1* | 4/2021 | Moulon | G06T 17/00 |
| 2021/0127060 | A1* | 4/2021 | Ji | G01B 5/008 |
| 2021/0150805 | A1* | 5/2021 | Stekovic | G06T 3/10 |
| 2021/0158609 | A1* | 5/2021 | Raskob | G06T 17/05 |
| 2021/0279950 | A1* | 9/2021 | Phalak | G06F 18/231 |
| 2021/0385378 | A1* | 12/2021 | Cier | H04N 5/2624 |
| 2022/0003555 | A1* | 1/2022 | Colburn | G06V 20/64 |
| 2022/0027656 | A1* | 1/2022 | Jia | G06T 7/55 |
| 2022/0114291 | A1* | 4/2022 | Li | G06T 19/00 |
| 2022/0148327 | A1* | 5/2022 | Fu | G06V 30/147 |
| 2022/0156426 | A1* | 5/2022 | Hampali | G06T 17/20 |
| 2022/0164493 | A1* | 5/2022 | Li | G06V 20/36 |
| 2022/0224833 | A1* | 7/2022 | Cier | H04N 23/53 |
| 2022/0269885 | A1* | 8/2022 | Wixson | G06V 10/82 |
| 2022/0269888 | A1* | 8/2022 | Stoeva | G06T 19/006 |
| 2022/0358694 | A1* | 11/2022 | Zhang | G06T 15/10 |
| 2022/0358716 | A1* | 11/2022 | Zhang | G06T 7/60 |
| 2022/0383572 | A1* | 12/2022 | Hu | G06V 10/778 |
| 2022/0406007 | A1* | 12/2022 | Ton-That | G06T 17/00 |
| 2023/0035601 | A1* | 2/2023 | Alimo | G06F 30/27 |
| 2023/0071446 | A1* | 3/2023 | Narayana | G06F 16/5866 |
| 2023/0095173 | A1* | 3/2023 | Khosravan | G06T 5/73 |
| 2023/0106339 | A1* | 4/2023 | Goyal | G06T 7/13 345/634 |
| 2023/0128740 | A1* | 4/2023 | Hong | G06F 30/13 703/1 |
| 2023/0138762 | A1* | 5/2023 | Lambert | G01C 21/206 382/103 |
| 2023/0154110 | A1* | 5/2023 | Stout | G06T 17/20 345/156 |
| 2023/0184949 | A1* | 6/2023 | Huang | G06V 10/40 356/4.01 |
| 2023/0196670 | A1* | 6/2023 | Su | G06T 17/00 |
| 2023/0206393 | A1* | 6/2023 | Hutchcroft | G06V 10/26 382/284 |
| 2023/0259667 | A1* | 8/2023 | Palmer | G01P 13/00 703/1 |
| 2023/0306539 | A1* | 9/2023 | Frei | G06V 10/454 |
| 2023/0306629 | A1* | 9/2023 | Cho | H04N 23/633 |
| 2023/0334803 | A1* | 10/2023 | Odamaki | G06T 19/006 |
| 2023/0368458 | A1* | 11/2023 | Dryer | G06F 3/017 |
| 2023/0409766 | A1* | 12/2023 | Narayana | H04N 23/698 |
| 2023/0419526 | A1* | 12/2023 | Lianos | G06T 7/194 |
| 2024/0029352 | A1* | 1/2024 | Wan | G06T 7/12 |
| 2024/0096097 | A1* | 3/2024 | Penner | G06N 20/00 |
| 2024/0118103 | A1* | 4/2024 | Shin | G01C 21/206 |
| 2024/0161348 | A1* | 5/2024 | Hutchcroft | G06T 7/60 |
| 2024/0312136 | A1* | 9/2024 | Narayana | G06T 7/73 |
| 2024/0371061 | A1* | 11/2024 | Wei | G06F 30/13 |

OTHER PUBLICATIONS

Liu, Chenxi, et al. "Rent3d: Floor-plan priors for monocular layout estimation." Proceedings of the IEEE conference on computer vision and pattern recognition. 2015. (Year: 2015).*

Zou, Chuhang, et al. "Manhattan Room Layout Reconstruction from a Single 360^ ° 360° Image: A Comparative Study of State-of-the-Art Methods." International Journal of Computer Vision 129 (2021): 1410-1431. (Year: 2021).*

Fernandes, L.A. and Oliveira, M.M., 2008. Real-time line detection through an improved Hough transform voting scheme. Pattern recognition, 41(1), pp. 299-314.

Zhang, Y., Song, S., Tan, P. and Xiao, J., Sep. 2014. Panocontext: A whole-room 3d context model for panoramic scene understanding. In European conference on computer vision (pp. 668-686). Springer, Cham.

Long, J., Shelhamer, E. and Darrell, T., 2015. Fully convolutional networks for semantic segmentation. In Proceedings of the IEEE

(56) References Cited

OTHER PUBLICATIONS conference on computer vision and pattern recognition (pp. 3431-3440).
Zitova, B. and Flusser, J., 2003. Image registration methods: a survey. Image and vision computing, 21(11), pp. 977-1000.
Maillot, Patrick-Gilles. "A new, fast method for 2D polygon clipping: analysis and software implementation." ACM Transactions on Graphics (TOG) 11, No. 3 (1992):276-290.
Narkhede, A. and Manocha, D., 1995. Fast polygon triangulation based on seidel's algorithm. In Graphics Gems V (pp. 394-397). Academic Press.
Schmitt, A., Muller, H. and Leister, W., 1988. Ray tracing algorithms—theory and practice. In Theoretical foundations of Computer Graphics and CAD (pp. 997-1030). Springer, Berlin, Heidelberg.
Nakamoto A, Kawatani G, Matsumoto N, Urrutia J. Geometric quadrangulations of a polygon. Electronic Notes in Discrete Mathematics. Jul. 1, 2018;68:59-64.
Cohen-Or D, Kaufman A. Fundamentals of surface voxelization. Graphical models and image processing. Nov. 1, 1995;57(6):453-61.
Sik, Martin, and Jaroslav Krivanek. "Fast Random Sampling of Triangular Meshes." (2013), pp. 1-6.
Office Action received for Japanese Patent Application No. 2023-560170, mailed on Aug. 5, 2024, 9 pages (4 pages of English Translation and 5 pages of Original Document).
Cabral et al., "Piecewise Planar and Compact Floorplan Reconstruction from Images", 2014 IEEE Conference on Computer Vision and Pattern Recognition, Jun. 2014, pp. 628-635.
Extended European Search Report received for European Patent Application No. 22925212.7, mailed on May 2, 2025, 13 pages.
Pintore et al., "Recovering 3D existing-conditions of indoor structures from spherical images", Computers and Graphics, Elsevier, vol. 77, Sep. 2018, pp. 16-29.

\* cited by examiner

MANHATTAN LAYOUT ESTIMATION USING GEOMETRIC AND SEMANTIC INFORMATION

INCORPORATION BY REFERENCE

The present application claims the benefit of priority to U.S. Provisional Application No. 63/306,001, "A Method for Manhattan Layout Estimation from Multiple Panorama Images using Geometry and Semantic Segmentation Information" filed on Feb. 2, 2022, which is incorporated by reference herein in its entirety.

TECHNICAL FIELD

The present disclosure describes embodiments generally related to image coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies have been developed to capture and represent the world, such as objects in the world, environments in the world, and the like in 3-dimensional (3D) space or shapes. 3D representations of the world can enable more immersive forms of interaction and communication. In some examples, 3D shapes are widely used to represent such immersive contents.

SUMMARY

Aspects of the disclosure provide methods and apparatuses for image coding (e.g., compression and decompression). In some examples, an apparatus for image coding includes processing circuitry.

According to an aspect of the disclosure, a method for estimating a Manhattan layout associated with a scene is provided. In the method, a plurality of two-dimensional (2D) images of the scene can be received. Geometric information and semantic information of each of the plurality of 2D images can be determined. The geometric information can indicate a detected line and a reference direction in the respective 2D image. The semantic information can include classification information of pixels in the respective 2D image. A layout estimation associated with the respective 2D image of the scene can be determined based on the geometric information and the semantic information of the respective 2D image. A combined layout estimation associated with the scene can be determined based on a plurality of the determined layout estimations associated with the plurality of 2D images of the scene. The Manhattan layout associated with the scene can be generated based on the combined layout estimation. The Manhattan layout can include at least a three-dimensional (3D) shape of the scene that includes wall faces orthogonal with respect to each other.

To determine the geometric information and the semantic information, first geometric information of a first 2D image of the plurality of 2D images can be extracted. The first geometric information can include at least one of detected lines, reference directions of the first 2D image, a ratio of a first distance from a ceiling to a ground and a second distance from a camera to the ground, or a relative pose (e.g., angle or distance) between the first 2D image and a second 2D image of the plurality of 2D images. Pixels of the first 2D image can be labelled to generate first semantic information, where the first semantic information can indicate first structure information of the pixels in the first 2D image.

To determine the layout estimation associated with the respective 2D image of the scene, a first layout estimation of the plurality of layout estimations associated with the scene can be determined based on the first geometric information and the first semantic information of the first 2D image. To determine the first layout estimation, whether each of the detected lines is a borderline that corresponds to a wall border in the scene can be determined. The borderlines of the detected lines can be aligned with the reference directions of the first 2D image. A first polygon that indicates the first layout estimation can be generated based on the aligned borderlines with one of 2D polygon denoising and a staircase removal.

To generate the first polygon, a plurality of incomplete borderlines of the borderlines can be completed based on one of (i) estimating the plurality of incomplete borderlines based on a combination of a ceiling borderline and a floor borderline of the borderlines, and (ii) connecting a pair of incomplete borderlines of the plurality of incomplete borderlines. The pair of incomplete borderlines can be connected based on one of (i) adding a perpendicular line to the pair of incomplete borderlines in response to the pair of incomplete borderlines being parallel and (ii) extending at least one of the pair of incomplete borderlines such that an intersection of the pair of incomplete borderlines is positioned on the extended pair of incomplete borderlines.

To determine the combined layout estimation associated with the scene, a base polygon can be determined by combining a plurality of polygons via a polygon union algorithm. Each of the plurality of polygons can correspond to a respective layout estimation of the plurality of the determined layout estimations. A shrunk polygon can be determined based on the base polygon. The shrunk polygon can include updated edges that are updated from edges of the base polygon. A final polygon can be determined based on the shrunk polygon with one of the 2D polygon denoising and the staircase removal. The final polygon can correspond to the combined layout estimation associated with the scene.

To determine the shrunk polygon, a plurality of candidate edges can be determined from the plurality of polygons for the edges of the base polygon. Each of the plurality of candidate edges can correspond to a respective edge of the base polygon. The updated edges of the shrunk polygon can be generated by replacing one or more edges of the base polygon with the corresponding one or more candidate edges in response to the one or more candidate edges being closer to original view positions in the plurality of images than the corresponding one or more edges of the base polygon.

In some embodiments, each of the plurality of candidate edges can be parallel to the corresponding edge of the base polygon. A projected overlapping portion between the respective candidate edge and the corresponding edge of the base polygon can be larger than a threshold.

To determine the combined layout estimation associated with the scene, an edge set that includes edges of the final polygon can be determined. A plurality of edge groups can be generated based on the edge set. A plurality of internal edges of the final polygon can be generated. The plurality of internal edges can be indicated by a plurality of average edges of one or more edge groups of the edge set. Each of the one or more edge groups of the plurality of edge groups can include a respective number of edges that is greater than a target value. Each of the plurality of average edges can be obtained by averaging edges of a respective one of the one or more edge groups.

In some embodiments, the plurality of edge groups can include a first edge group. The first edge group can further include a first edge and a second edge. The first edge and the second edge can be parallel. A distance between the first edge and the second edge can be less than a first threshold. A projected overlapping region between the first edge and the second edge can be greater than a second threshold.

To generate the Manhattan layout associated with the scene, the Manhattan layout associated with the scene can be generated based on one of triangle meshes triangulated from the combined layout estimation, quadrilateral meshes quadrangulated from the combined layout estimation, sampling points sampled from one of the triangle meshes and the quadrilateral meshes, or discrete grids generated from one of the triangle meshes and the quadrilateral meshes via voxelization.

In some embodiments, the Manhattan layout associated with the scene can be generated based on the triangle meshes triangulated from the combined layout estimation. Accordingly, to generate the Manhattan layout associated with the scene, a ceiling face and a floor face in the scene can be generated by triangulating the combined layout estimation. The wall faces in the scene can be generated by triangulating rectangles that surround a ceiling borderline and a floor borderline in the scene. Textures of the Manhattan layout associated with the scene can be generated via a ray-casting based process.

According to another aspect of the disclosure, an apparatus is provided. The apparatus includes processing circuitry. The processing circuitry can be configured to perform any of the methods for estimating a Manhattan layout associated with a scene.

Aspects of the disclosure also provide a non-transitory computer-readable medium storing instructions which when executed by a computer cause the computer to perform any of the methods for estimating a Manhattan layout associated with a scene.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
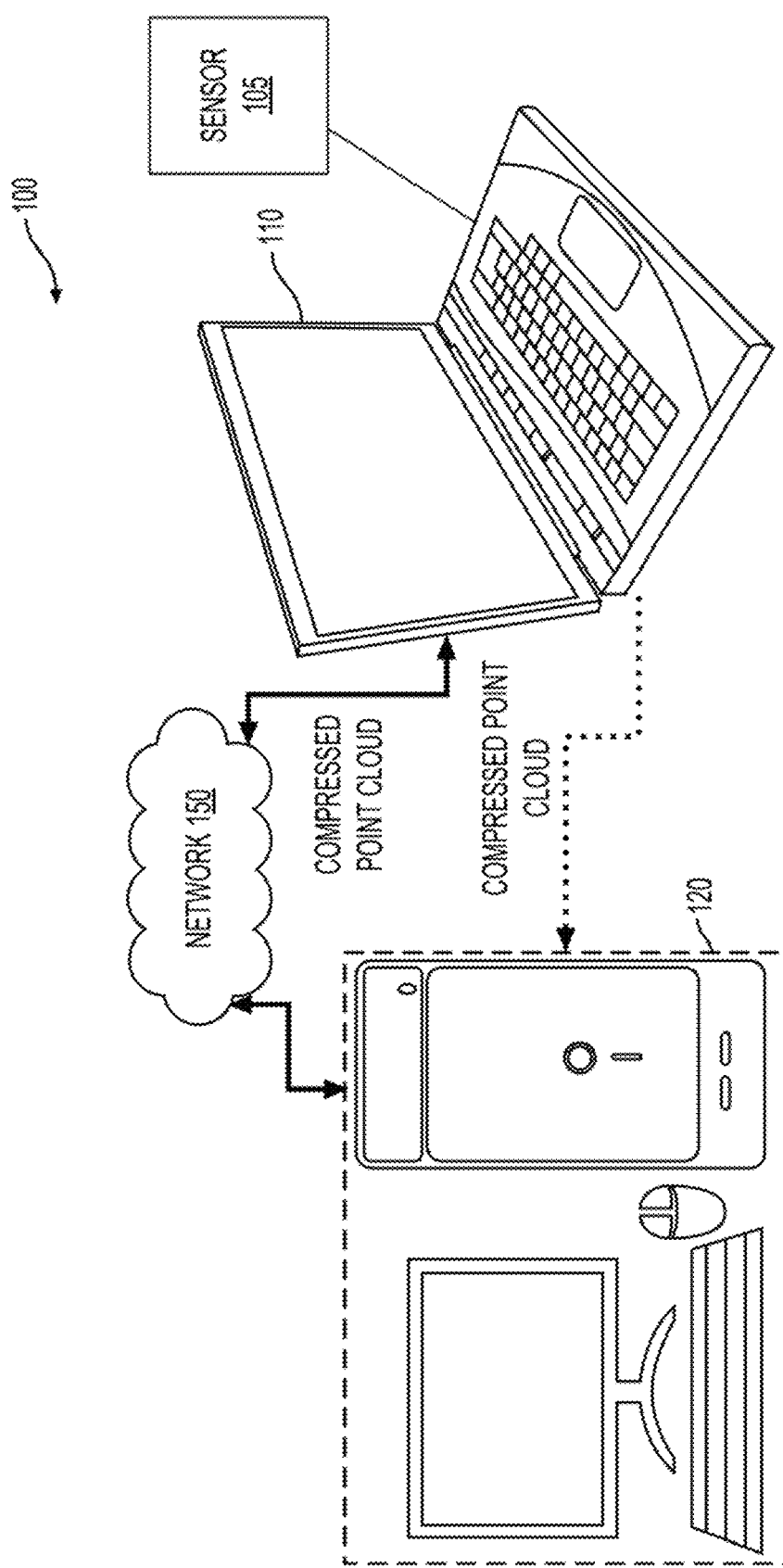
FIG. 1 shows a block diagram of a communication system in some examples.

Aspects of the disclosure include techniques in the field of three-dimensional (3D) media processing.

Technological developments in 3D media processing, such as advances in 3D capture, 3D modeling, 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experiences, 3D models are becoming ever more sophisticated, and the creation and consumption of 3D models occupy a significant amount of data resources, such as data storage and data transmission resources.

In some embodiments, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

In some embodiments, some coding tools for point cloud compression (PCC) can be used for mesh compression. For example, a mesh can be re-meshed to generate a new mesh for which the connectivity information of vertices of the new mesh can be inferred (or pre-defined). The vertices of the new mesh, and the attributes associated with the vertices of the new mesh can be considered as points in a point cloud and can be compressed using PCC codecs.

Point clouds can be used to reconstruct an object or a scene as a composition of such points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
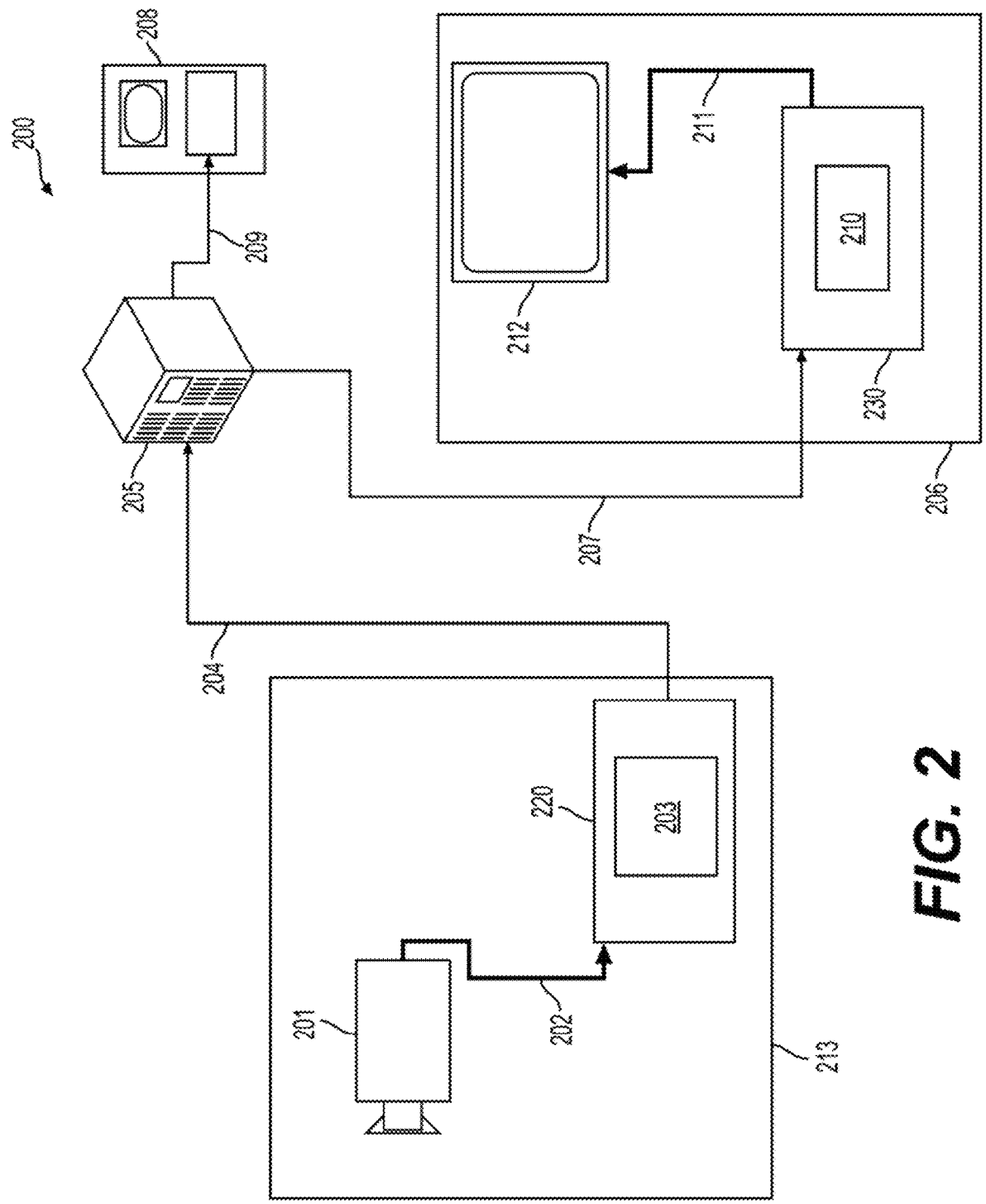
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
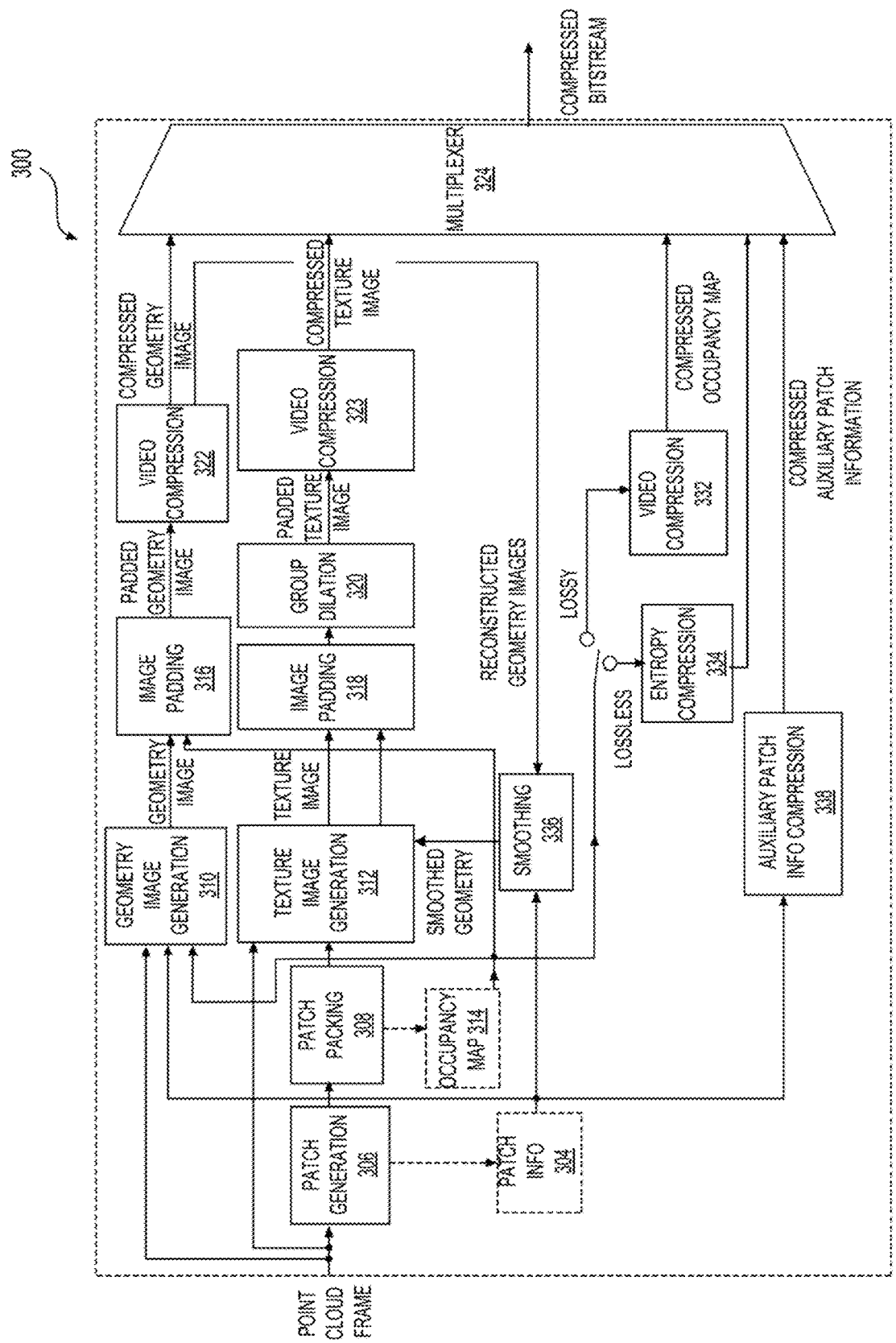
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation module (312). Then, the texture image generation module (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation module (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
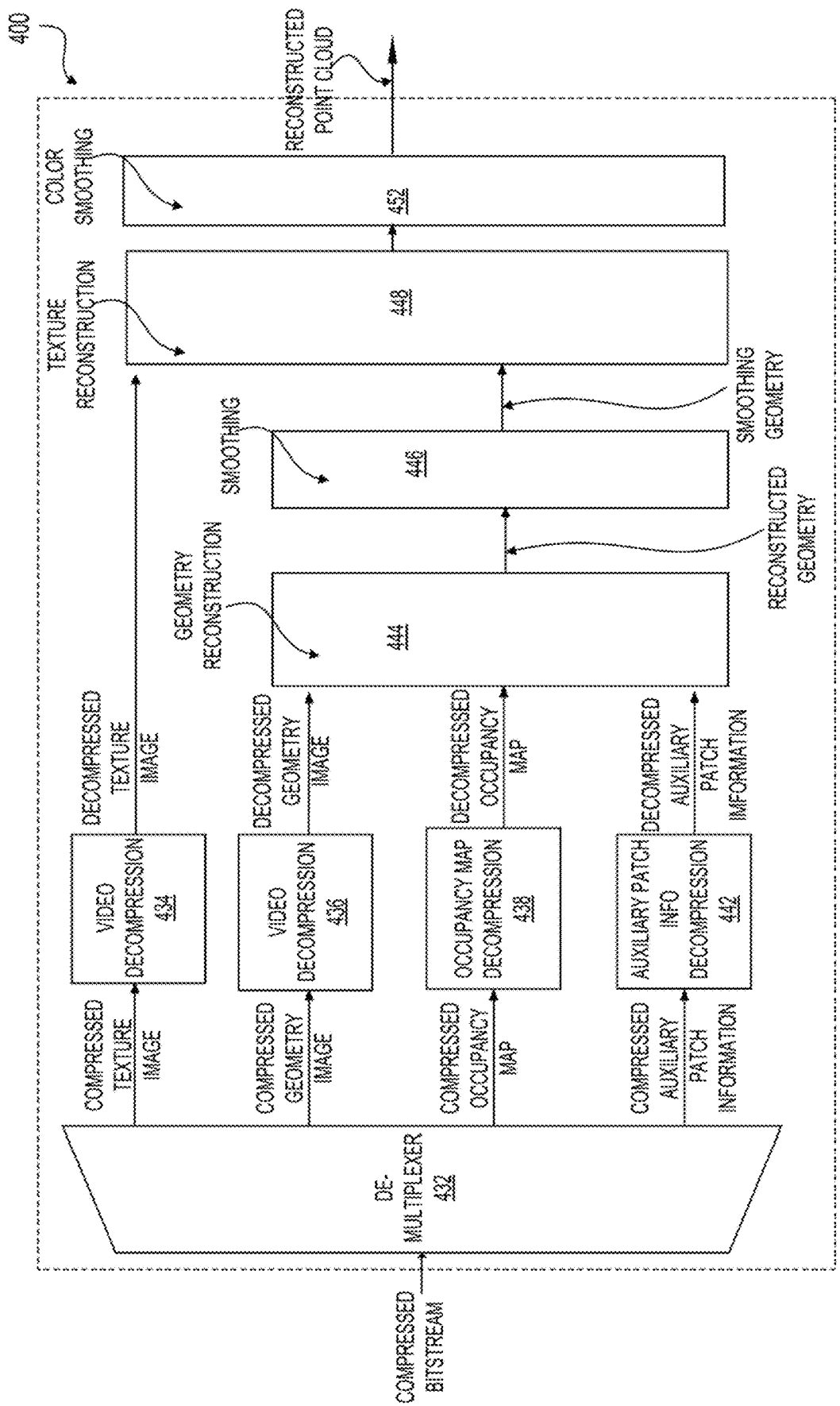
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
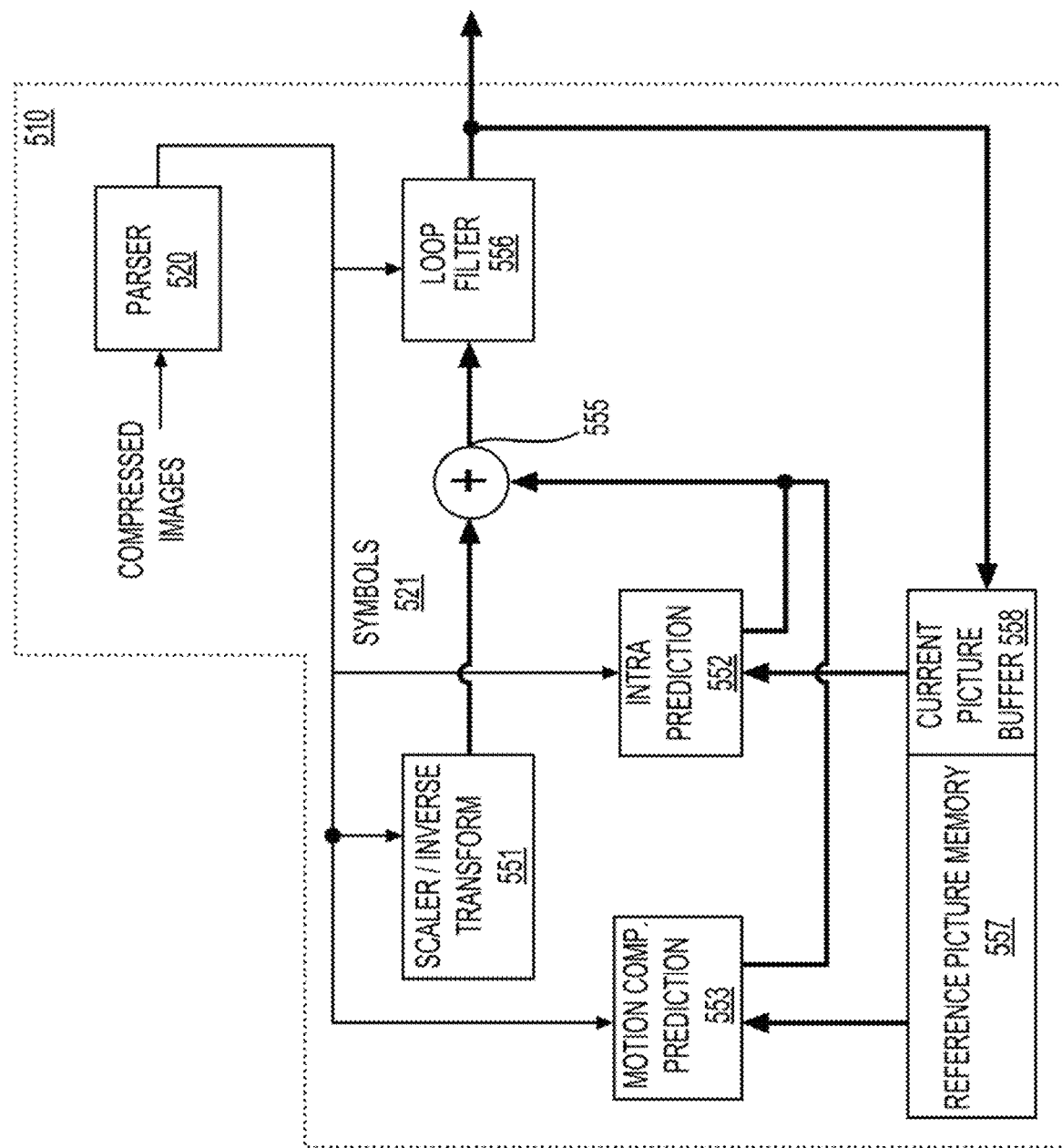
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth.

The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform unit (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
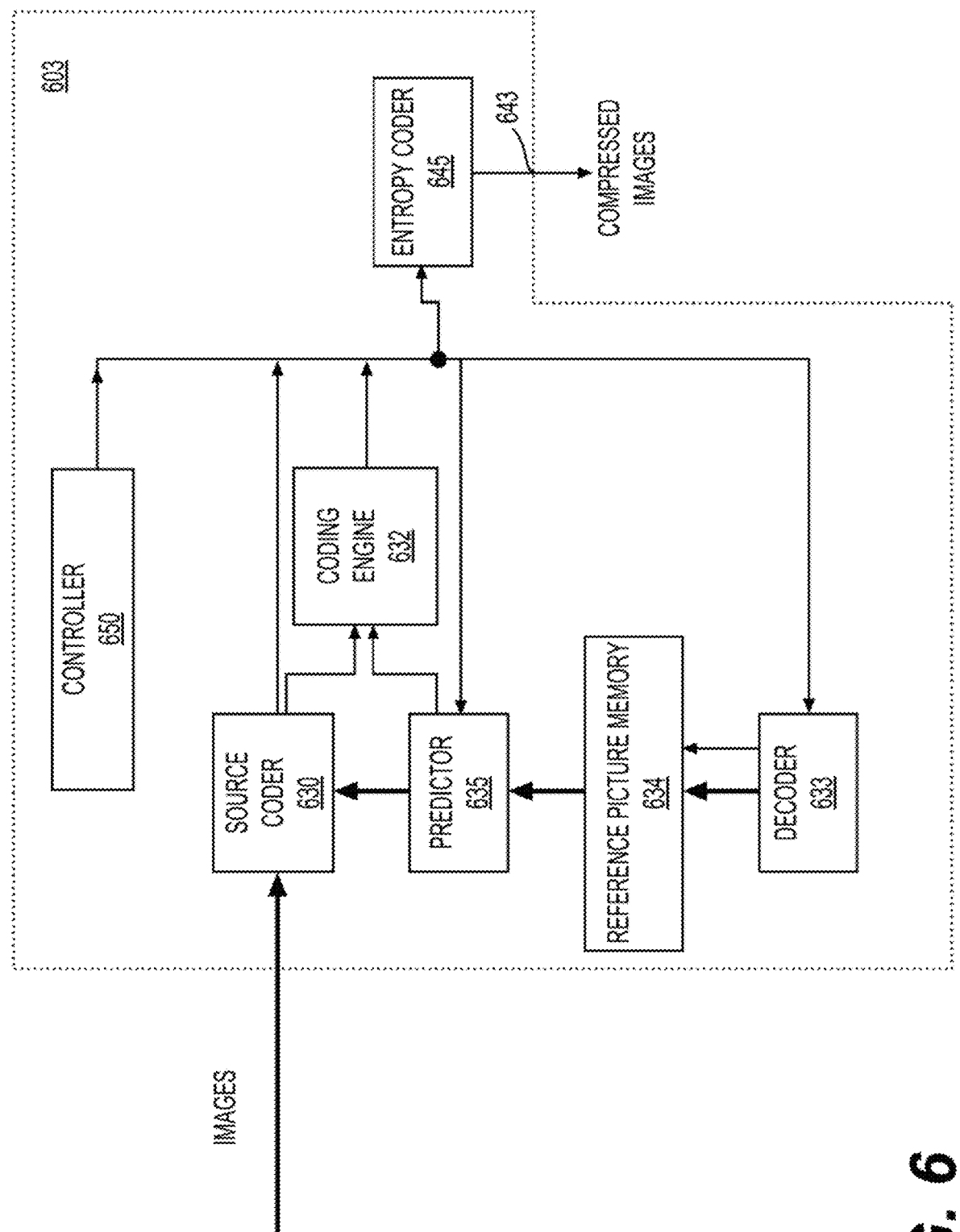
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
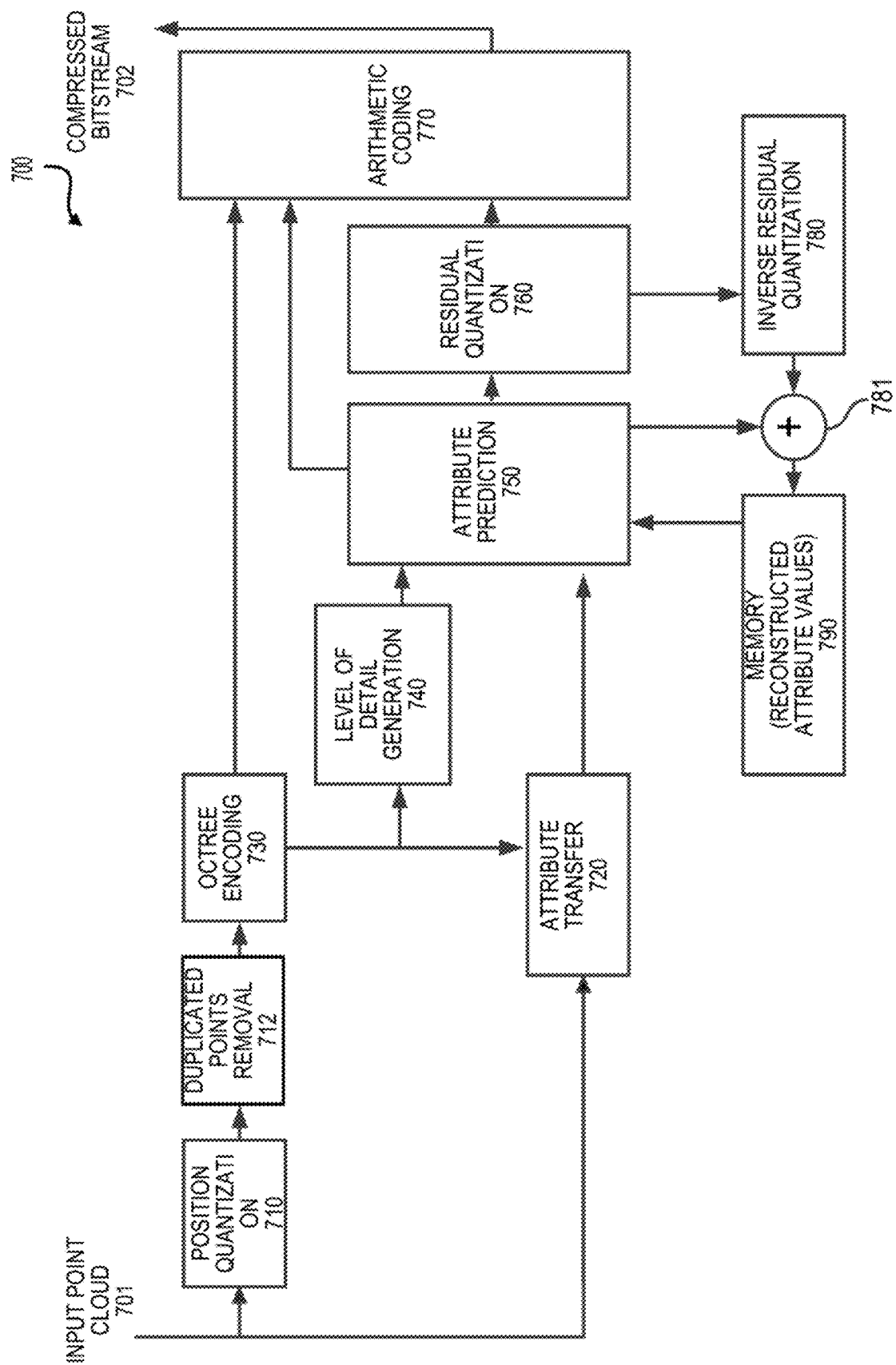
FIG. 7 shows a block diagram of an encoder for encoding point cloud frames, in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
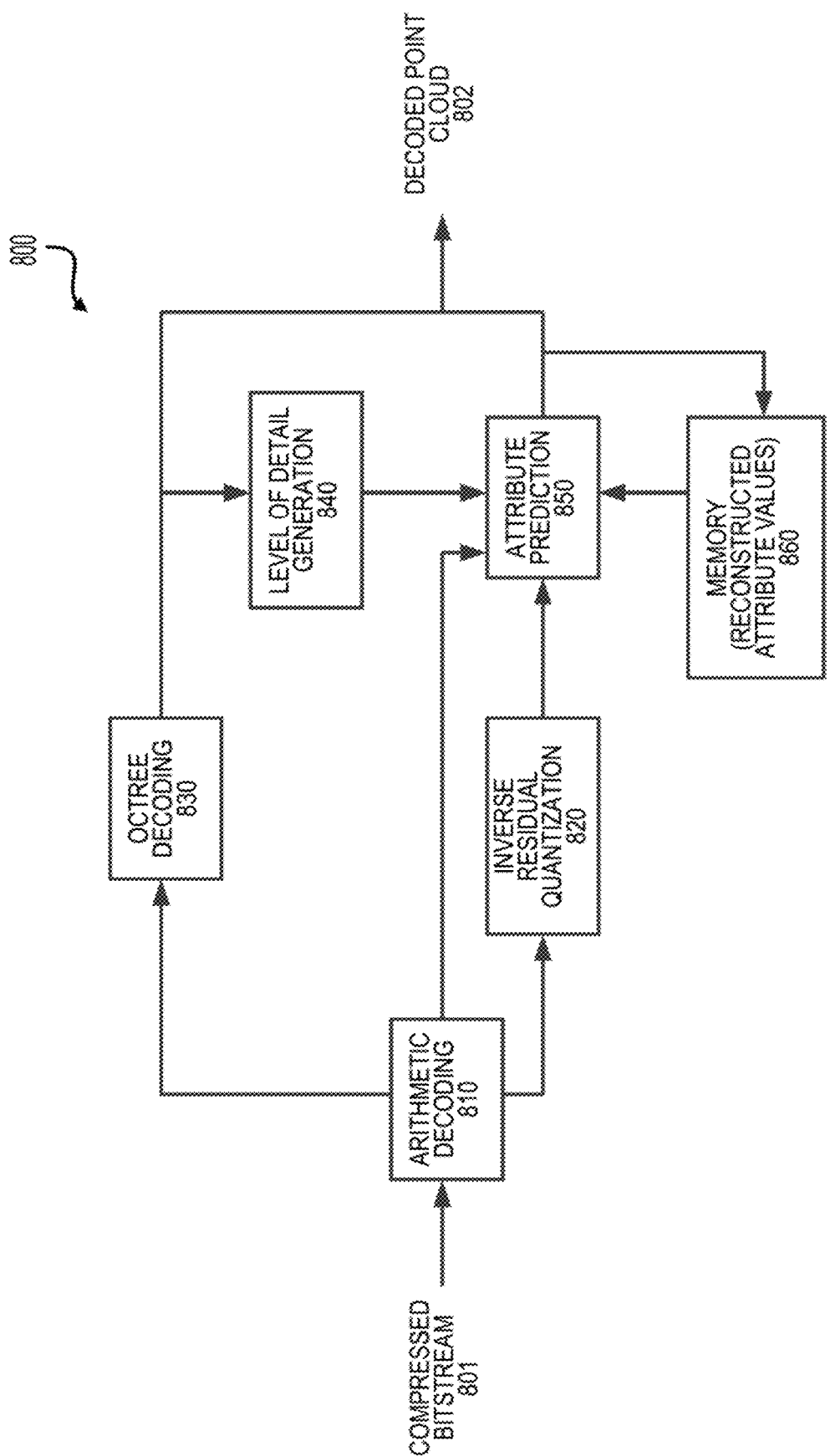
FIG. 8 shows a block diagram of a decoder for decoding a compressed bitstream corresponding to point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

The disclosure includes embodiments related to estimation of a Manhattan layout, including estimation of a Manhattan layout of a scene from various panoramas of the scene. The embodiments can be used to create virtual reality and augmented reality applications, such as virtual tours. For example, a Manhattan layout can be estimated from numerous panorama images utilizing geometry and segmentation information.

In applications such as robotics, virtual reality, and augmented reality, estimation of a layout of a room from an image is a common practice. A layout of a room can include positions, orientations, and heights of walls of the room with respect to a specific reference point. For example, intersection points of the walls, a 3D mesh, or a point cloud can be employed to depict the layout of the room. In a Manhattan layout of a room, walls of the room are perpendicular to one another. Panoramic images can be generated via cameras, such as a panoramic camera. Panoramic images can be applied to depict a layout of a room. However, estimation of a Manhattan layout of a room by analyzing multiple panoramic images can be challenging. The panoramas (or panoramic images) can encapsulate 360 degrees of information in a scene and the 360 degree of information may contain far more data than perspective images.

A Manhattan layout of the room can be estimated by using geometric information and semantic segmentation of information (e.g., pixels) from multiple panoramic views (or panoramic images). Semantic segmentation can be performed using a deep learning algorithm that associates a label or category with every pixel in an image. Semantic segmentation can be used to recognize a collection of pixels that form distinct categories.

Multiple panoramas (or panoramic images) can be used to estimate a Manhattan layout of a room because a single panorama may not provide an accurate representation of a layout of the room. For example, objects in the room can block a wall boundary of the room, or the room is very large and a single panoramic image may not capture the room fully. The geometric information can include two main directions (e.g., X direction and Z direction) of the Manhattan layout of the room as well as line segment information extracted from the panoramas. However, since the geometric information focuses on a geometric content of the room, the geometric information may lack semantic information. Therefore, semantic segmentation can be used to provide semantic information of pixels of the panoramas. Semantic segmentation can refer to labeling of a panorama (or a panoramic image) to determine a respective category for each pixel of the panorama. For example, a pixel can be label as one of a floor, a wall, or the like in the room based on the semantic segmentation.

Figure 9A:
FIG. 9A shows an exemplary panorama image in some examples.
Figure 9B:
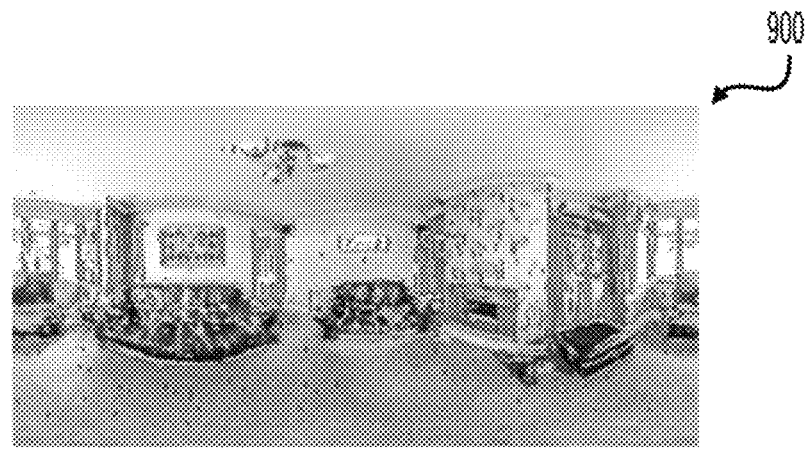
FIG. 9B shows an exemplary panorama image marked with geometric information in some examples.
Figure 9C:
FIG. 9C shows an exemplary panorama image marked with semantic information in some examples.

FIGS. 9A-9C illustrate an exemplary geometric and semantic representation of a panorama. As shown in FIG. 9A, a panorama (900) is provided, where the panorama (900) can include a scene of a hotel room. In FIG. 9B, the panorama (900) can be marked with information of geometric line segments. In FIG. 9C, semantic information of pixels of the room can be provided based on the semantic segmentation. For example, the semantic information of the pixels of the room can indicate a ceiling (902), a floor (904), a sofa (906), a wall (908), or the like.

A layout of a room can be represented in various ways, including 3D meshes, boundary lines, and point clouds. In the disclosure, the 3D meshes and the boundary lines of the room can be used to describe the layout of the room. The boundary lines can be represented by one or more polygons, and the 3D meshes of the room can be created from the polygons.

Figure 10A:
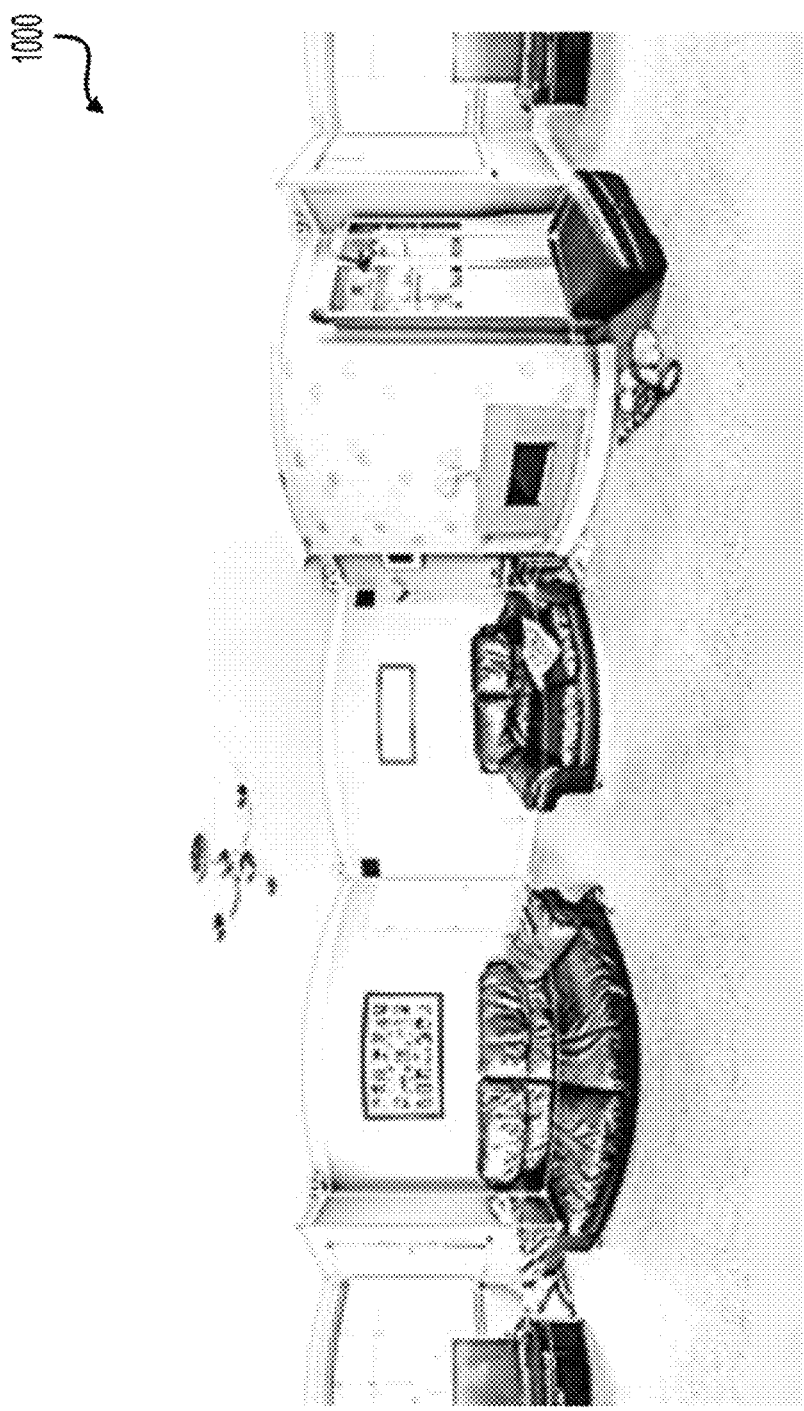
FIG. 10A shows an exemplary estimated room layout in some examples.
Figure 10C:
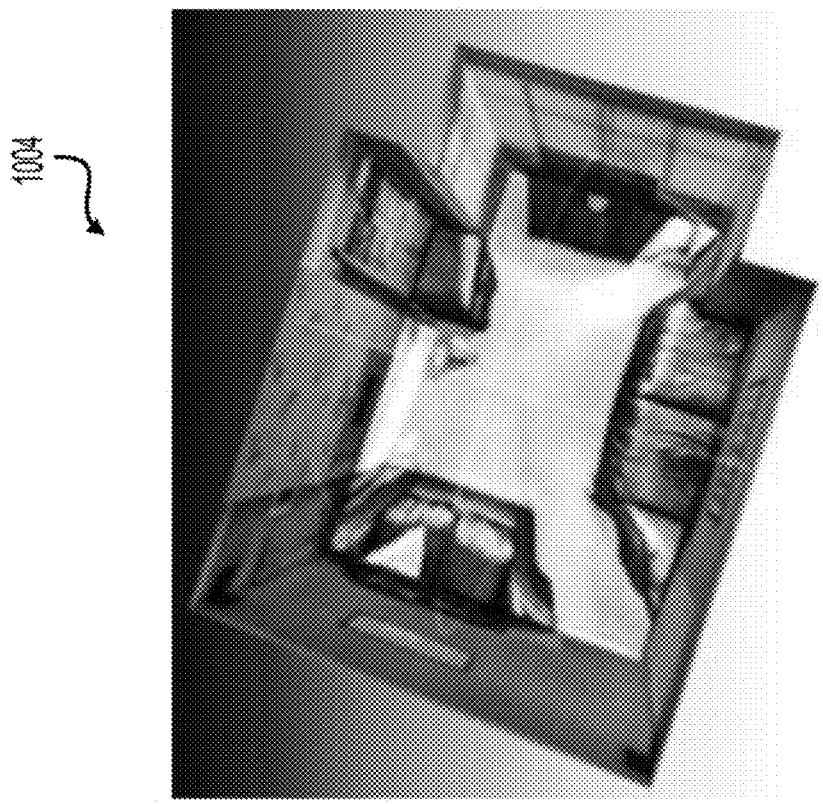
FIG. 10C shows an exemplary three-dimensional mesh generated based on a polygon in some examples.
Figure 10B:
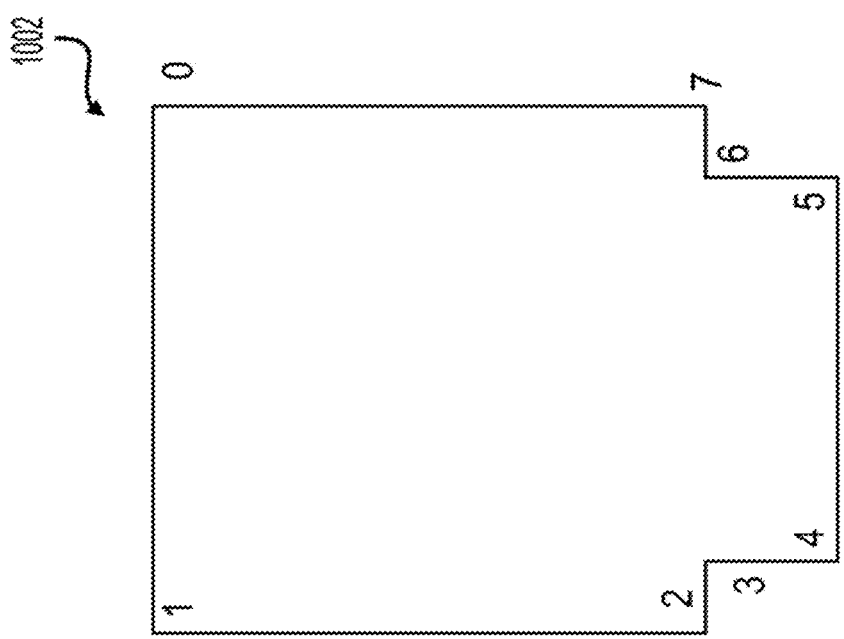
FIG. 10B shows an exemplary polygon that represents an estimated room layout in some examples.

FIGS. 10A-10C illustrate an exemplary polygon representation and an exemplary mesh representation of a room. As shown in FIG. 10A, an estimated room layout (1000) can be provided. In FIG. 10B, a polygon representation (1002) of the estimated room layout can be provided, where corners of the room layout can be labelled by numbers, such as 0-7. In FIG. 10C, a 3D mesh (1004) can be generated from the polygon (1002). According to FIGS. 10A-10C, when the layout (e.g., (1000)) of the room is established, wall planes can be projected into a floor plane to obtain the polygon (e.g., (1002)). In turn, if the polygon and a height of the walls are obtained, the layout and 3D mesh (e.g., (1004)) can be derived.

In the disclosure, estimation of a Manhattan layout of a room can be performed by estimating a polygon (e.g., polygon (1002)) based on geometric information and semantic information of a scene (e.g., the room layout (1000)). The polygon can be represented by a directed graph G=(v, e), where v is a set of the corners of the polygon, and e is a set of the edges connecting the corners. A position of each corner joint can be defined as a 2D coordinate (x, y) in a 2D space relative to a camera position. Each edge can be represented as a directed line segment $(p_s, p_e)$, where $p_s \in v$ and $p_e \in v$ are a start point and an end point of the edge respectively. A line function of each edge can be represented as ax+by+c=0, where n=(a, b) is a normal of the line which satisfies $\|n\|=1$, and c is a constant real number.

Figure 11:
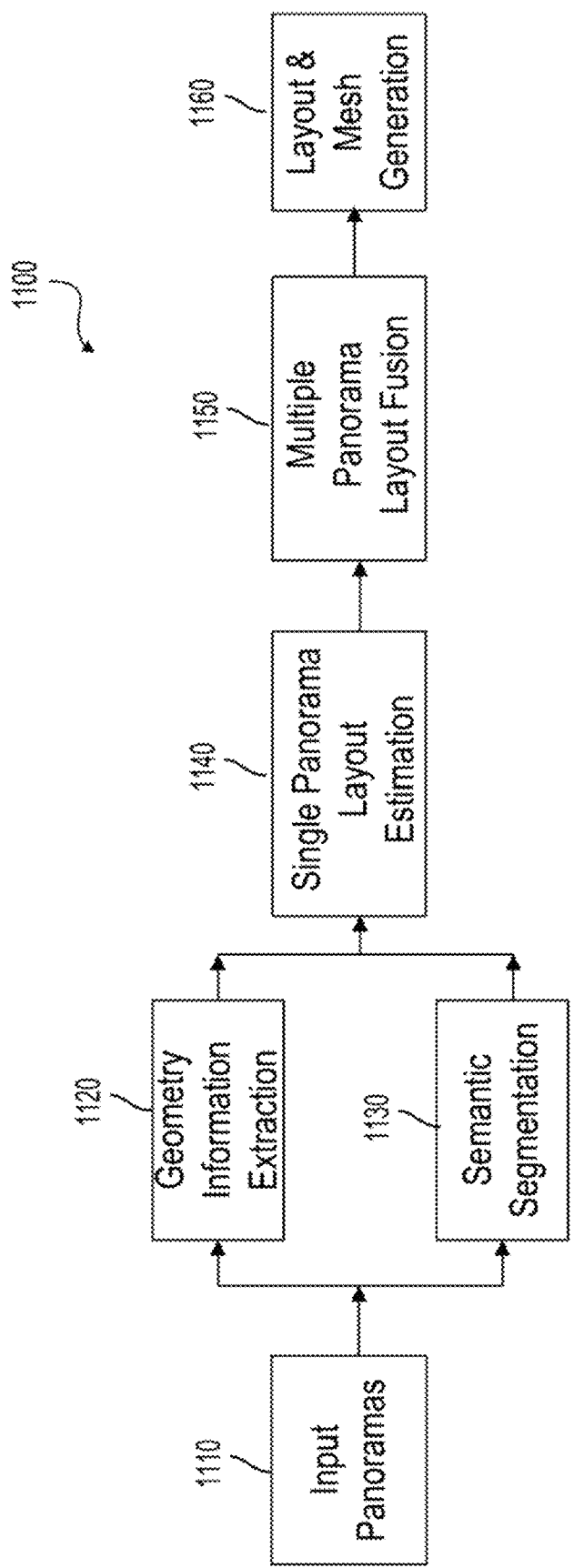
FIG. 11 shows an overview of a system for estimating a Manhattan layout in some examples.

FIG. 11 illustrates an overview of a system (or process) (1100) for estimating a Manhattan layout of a scene (e.g., a room). As shown in FIG. 11, at (1110), an input imagery can be provided. The input imagery can include a collection of panoramas (or a plurality of panoramic images) of the scene. The collection of panoramas can capture the scene from different view positions to represent the scene with more accuracy. At step (1120) and step (1130) of the process (1100), geometry information of each panoramic image can be extracted and semantic information of each panoramic can be determined based on semantic segmentation from the corresponding panoramic image. The geometry information (or geometric factors) can include (1) detected lines in each panoramic image, (2) main directions (e.g., X direction and Z direction) of each panoramic image, (3) a ratio between a distance from a ceiling of the room to a ground of the room and a distance from a camera to the ground, and (4) relative poses (e.g., relative positions, angles, or distances) between the panoramic images, such as between two respective panoramic images. The semantic information can be obtained through the semantic segmentation. The semantic segmentation can assign semantic meaning (e.g., floor, door, etc.) to each pixel of a panoramic image. At step (1140), a respective layout of the scene can be estimated based on the geometric information and semantic segmentation of each panoramic image. At step (1150), the estimated layouts from each panorama image (or panoramic image) can be combined to generate a final estimation of the room layout. At step (1160), a 3D mesh (or a Manhattan layout) of the room can be generated based on the estimated layout (or the final estimation of the room layout).

To determine a layout estimation associated with a scene (e.g., a room) based on the geometric information and the semantic information of each panoramic image, such as an example in step (1140) of FIG. 11, results of the semantic segmentation can be used to determine whether each line segment of the panorama (or panoramic image) represents a wall border of the room. Given a line l represented as a sequence of points $p_0, p_1, \ldots, p_n$ in the panorama image, whether neighbor pixels of each point $p_i$ contain walls or not can be checked. If the neighbor pixels of the point $p_i$ contain only walls or do not have any wall pixels, then the point $p_i$ may not be considered as a border point. If the number of border points exceeds a certain threshold, e.g., 80% of the points are borders, then the point line (or line) l can be designated as a border (or borderline).

The borderlines can be aligned with major directions (or main directions) of the panorama. To align the borderlines with the major directions, each borderline can be projected onto a horizontal plane (e.g., a X-Z plane). As the two main directions (e.g., X and Z) are perpendicular, an angle between the projected borderline and the two main directions can be calculated. The projected borderline can then be rotated around a center of the projected borderline to make the projected borderline parallel to the main directions.

However, objects within the image (or panoramic image) may block the borderlines. Therefore, one or more borderlines can be incomplete. In a first approach, a combination of ceiling borderlines and floor borderlines can be used to estimate the incomplete borderlines (or complete the one or more incomplete borderlines). For example, each floor line (or floor borderline) can correspond to a ceiling line (or ceiling borderline) and a distance between the floor line and the ceiling line can be fixed within the scene. An incomplete borderline can be projected to the ceiling line and the floor line, respectively. Coordinates of points of the incomplete borderline on the corresponding projected boundaries (or projected borderlines) of the ceiling and floor can be:

$p_{c,1}, p_{c,2}, p_{c,3}, \ldots, p_{c,n}$ $p_{f,1}, p_{f,2}, p_{f,3}, \ldots, p_{f,n}$ Based on a ratio r between a first distance from the ceiling to the ground and a second distance from the camera to the ground, the points of the incomplete borderline can be scaled (or estimated) to combine the projected points on the ceiling borderline and the floor borderline in equation (1) as follows:

$$p_{c,i} = \frac{1}{r-1} p_{f,i} \text{ for } i = 1, \ldots, n \quad \text{Eq. (1)}$$

In a second approach, the projected line segments (e.g., the projected borderline onto the horizontal plane) can be connected using a Manhattan layout hypothesis. As defined in the Manhattan layout hypothesis, each pair of two connected boundaries can be parallel or perpendicular. Accordingly, the projected borderlines can be sorted according to original spatial coordinates of the borderlines in an image space (e.g., a X-Y-Z space) of the scene. When two lines (or borderlines) are parallel, a perpendicular line can be added to join the two lines. When two lines are perpendicular, whether an intersection of the two lines is on the two line segments (or two lines) can be determined. In response to the intersection not being on the two lines, the two line segments (or two lines) can be extended so that the intersection point can be positioned on the two line segments.

A polygon can be obtained based on one or a combination of the first and second approaches. In some embodiments, the polygon can be refined using geometric processing methods, such as 2D polygon denoising, staircase removal, or the like. Thus, a plurality of polygons can be obtained based on the panoramic images. Each polygon can be derived from a respective panoramic image and indicate a respective layout estimation of the scene (e.g., the room).

Various approaches can be applied to denoise an existing curve (or line segment). In an example, a boundary of the curve (or line segment) can be fitted to regions with noisy points and then region thinning can be applied. In an example, a multi-scale analysis, such as a Gaussian kernel, can be applied. The multi-scale analysis can preserve sharp points with a shock detector and output the curve as a collection of smooth arcs and corners. In another example, Gaussian smoothing can be applied for noise that is estimated by local analysis, with a fixed n number of numbers, such as n=30 neighbors.

Staircase removal can reduce staircase artifacts. Staircase artifacts can be common artifacts which may be observed in many de-noising tasks, such as one-dimensional signal de-noising, two-dimensional image de-noising, and video de-noising. Image de-noising technologies may flatten one or more regions of an image signal, and thereby create staircase artifacts in the image signal. Consequently, the staircase artifacts may manifest in the one or more regions of the image signal, as undesired false steps or undesired flat regions in an otherwise smoothly varying image signal.

To generate a layout estimation of the scene based on the respective layout estimation from each panoramic image, such as an example of the step (1150) in FIG. 11, the polygons that were derived in a previous step (e.g., step (1140)) can be converted to a same coordinate system based on estimated relative positions between panorama images. The transformed (or derived) polygons from step (1140) can be denoted as $poly_0, poly_1, \ldots poly_n$. In order to generate the layout estimation of the scene, two separate processes can be employed to obtain the layout: contour estimation and internal edge estimation.

In the contour estimation, a contour of the layout estimation can be determined. The contour estimation can utilize a polygon union algorithm to join the transformed polygons $poly_0, poly_1, \ldots poly_n$ together as a baseline polygon $poly_{base}$.

The baseline polygon $poly_{base}$ can then be shrunk to form a shrunk polygon $poly_{shrunk}$. To shrink the baseline polygon $poly_{base}$, candidates edges $E=\{e'_i, e'_{i+2}, \ldots, e'_j\}$ can be determined for each edge $e_i$ of the baseline polygon $poly_{base}$. The candidate edges E can be chosen from the original transformed polygons, $poly_0, poly_1, \ldots poly_n$, and satisfy at least one of conditions as follows:

(1) Each edge $e'_i \in E$ is parallel to $e_i$, and
(2) A projected overlapping percentage of $e'_i$ to $e_i$ is larger than a threshold, e.g., 70%. The projected overlapping percentage can be determined by projecting $e'_i$ to $e_i$ and then computing a ratio of the projected portion of the line segment of $e'_i$ on the line segment of $e_i$.

Among all the candidate edges $E=\{e'_i, e'_{i+2}, \ldots, e'_j\}$, a candidate edge $e'_i$ that is closer to an origin view position (e.g., a position of the edge in the original panoramas image) can be used to replace $e_i$. Thus, one or more edges $e_i$ can be replaced by the corresponding one or more candidate edges $e'_i$ when the one or more candidate edges $e'_i$ are closer to the origin view position.

In the formation of the baseline polygon $poly_{base}$, all the edges of the transformed polygons $poly_0, poly_1, \ldots poly_n$ are merged together in the baseline polygon poly$_{base}$, and matching between the edges e$_i$ in the base polygon and the edges in the transformed polygons may not be considered. By projecting the base polygon poly$_{base}$ into each transformed polygon, one or more e$_i$ can be replaced by the corresponding one or more candidate edges e'$_i$ when the one or more candidate edges e'$_i$ are closer to the origin view position. Thus, the edges e$_i$ in the base polygon and the edges in the transformed polygons can be matched in directions, sizes, positions, or the like.

Each of the edge e$_i$ in the baseline polygon poly$_{base}$ can then be compared with the corresponding candidate edge e'$_i$. Based on whether the corresponding candidate edge e'$_i$ is closer to the origin view position, the respective edge e$_i$ can be kept or replaced. The shrunk polygon poly$_{shrunk}$ can be formed by replacing one or more edges e$_i$ in the baseline polygon poly$_{base}$.

A final polygon poly$_{final}$ can further be obtained based on the shrunk polygon by using geometric processing methods, such as 2D polygon denoising, staircase removal, or the like.

The internal edge estimation can be configured to recover internal edges of the final polygon poly$_{final}$. To recover the internal edges, all the edges of the transformed polygons poly$_0$, poly$_1$, . . . poly$_n$, which are inside the final polygon poly$_{final}$, can be put into a set E'. Then a space-based edge voting strategy can be used to cluster (or group) the edges. For example, two edges in the final polygon poly$_{final}$ can be grouped when the two edges satisfy at least one of conditions as follows:

(1) the two edges are parallel.
(2) A distance between the two edges is small enough, such as less than a first threshold value.
(3) A projected overlap between the two edges is large enough, such as larger than a second threshold value.

Further, if a group of edges contains more than a certain number of edges, an average edge of the group of edges can be calculated to represent a recovered internal edge of the final polygon poly$_{final}$. Thus, an average edge of the group of edges can be added into the final polygon poly$_{final}$ as a recovered internal edge.

A 3D shape (or a Manhattan layout) of the room can be generated based on an estimated polygon (e.g., the final polygon poly$_{final}$) using various representations.

In an embodiment, the 3D shape of the room can be generated using triangle meshes. For example, a ceiling face and a floor face of the room can be generated by triangulating the final polygon poly$_{final}$. Wall faces of the room can be generated by triangulating rectangles that are surrounded by ceiling borderlines and floor borderlines. A ray-casting based method can further be applied to generate textures of the 3D mesh (or 3D shape).

In an embodiment, a quadrilateral can be used to represent the 3D shape of the room by quadrangulating the final polygon poly$_{final}$.

In an embodiment, point clouds can be used to represent the 3D shape of the room by sampling points from the triangle meshes or quadrilateral meshes. The triangle meshes can be obtained by triangulating the final polygon poly$_{final}$. The quadrilateral meshes can be obtained by quadrangulating the final polygon poly$_{final}$.

In an embodiment, the 3D shape of the room can be generated by voxelizing the final polygon. Accordingly, a voxel (or 3D shape) can be created by converting 3D models (e.g., the final polygon poly$_{final}$) into volumetric data (e.g., the 3D shape of the room).

In the disclosure, a method for estimating a Manhattan layout of a scene (e.g., a room) can be provided. The Manhattan layout of the scene can be estimated from multiple panorama images of the scene using geometry information and semantic segmentation information associated with the scene.

In an embodiment, main directions, line segments, and semantic segmentation can be used together to estimate a layout of the scene from a single panorama (or panoramic image) of the multiple panoramic images.

In an embodiment, pose information (e.g., angle or distance) of the panoramic images can be used to combine the layout of each panorama into a final layout estimate.

In an embodiment, a 3D shape (or the Manhattan layout) can be generated from the final room layout by triangulating the final polygon (e.g., poly$_{final}$), quadrangulating the final polygon, generating point clouds based on the final polygon, or voxelizing the model (e.g., the final layout estimate or the final polygon poly$_{final}$).

In an embodiment, line segments in the multiple panoramas can be detected by line detection methods. For example, as shown in step (1140) of FIG. 11, semantic segmentation can assign semantic meaning (e.g., floor, door, etc.) to each pixel of a panoramic image. Results of the semantic segmentation can be used to determine whether each line segment of the panorama (or panoramic image) represents a wall border of the room.

In an embodiment, the main directions (e.g., X and Z directions) of the panorama images can be obtained by analyzing statistics information of the line segments within the panorama images.

In an embodiment, semantic segmentation of the panorama images can be achieved using a deep learning based semantic segmentation technique. For example, semantic segmentation can be a deep learning algorithm that associates a label or a category with every pixel in an image (e.g., a panoramic image of the scene).

In an embodiment, panoramic pose estimation (e.g., angles or distances) of the panoramic images can be achieved using image alignment techniques. Based on alignment of two panoramic images, a relative angle or a relative distance between the two panoramic images can be determined.

In an embodiment, a ratio between a distance from a ceiling of the scene to a ground of the scene and a distance from a camera to the ground can be computed using the segmentation information.

Figure 12:
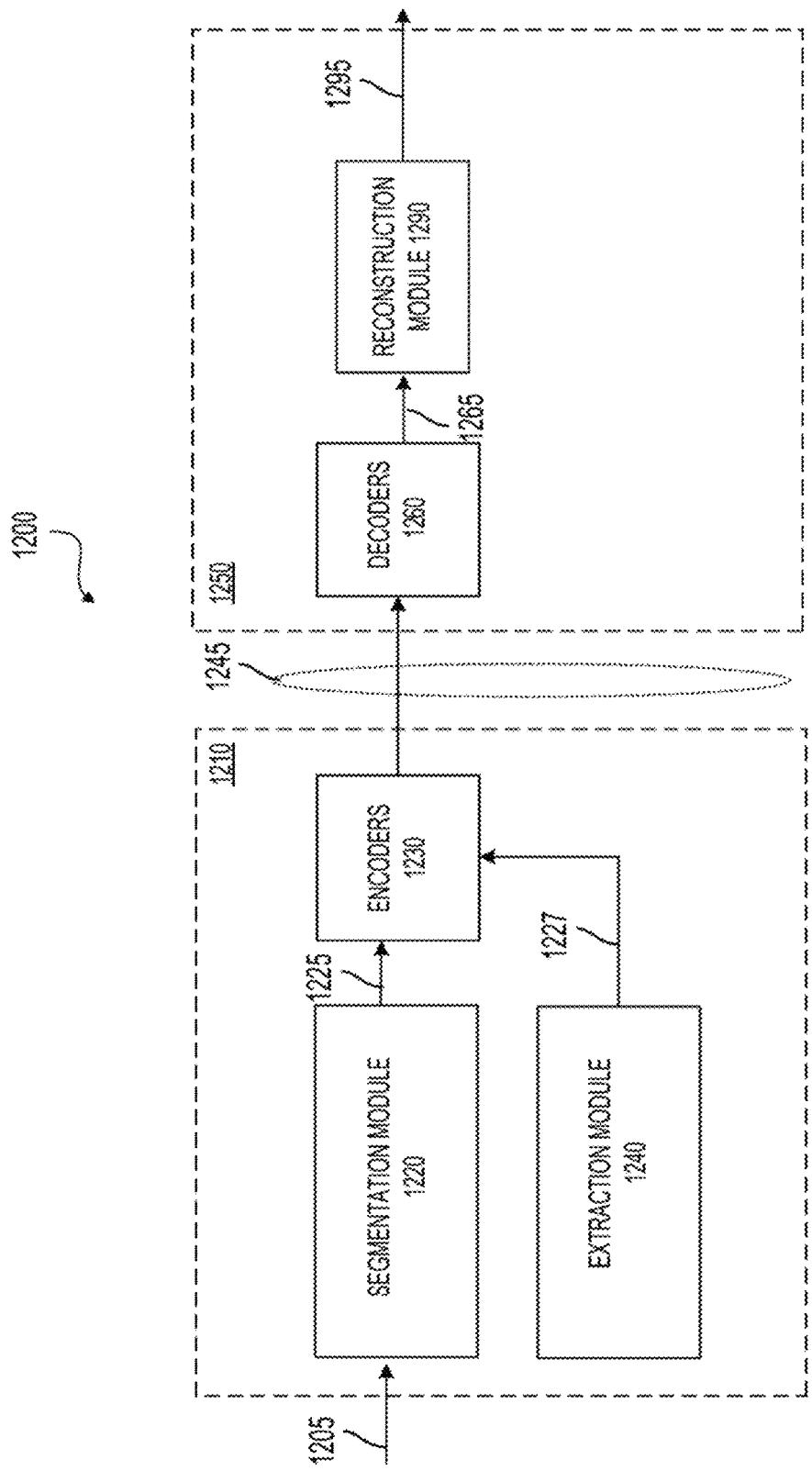
FIG. 12 shows a block diagram of a framework for image processing in some examples.

FIG. 12 shows a diagram of a framework (1200) for image processing according to some embodiments of the disclosure. The framework (1200) includes a video encoder (1210) and a video decoder (1250). The video encoder (1210) encodes an input (1205), such as a plurality of panoramic images of a scene (e.g., a room), into a bitstream (1245), and the video decoder (1250) decodes the bitstream (1245) to generate a reconstructed 3D shape (1295), such as a Manhattan layout of the scene.

The video encoder (1210) can be any suitable device, such as a computer, a server computer, a desktop computer, a laptop computer, a tablet computer, a smart phone, a gaming device, an AR device, a VR device, and the like. The video decoder (1250) can be any suitable device, such as a computer, a client computer, a desktop computer, a laptop computer, a tablet computer, a smart phone, a gaming device, an AR device, a VR device, and the like. The bitstream (1245) can be transmitted from the video encoder (1210) to the video decoder (1250) via any suitable communication network (not shown).

In the FIG. 12 example, the video encoder (1210) includes a segmentation module (1220), encoders (1230), and extraction module (1240) that are coupled together. The segmentation module (1220) is configured to assign semantic meaning (e.g., floor, door, etc.) to each pixel of a panoramic image associated with the scene. The semantic information of each panoramic image can be transmitted to the encoders (1230) through bitstream (1225) to the encoders (1230). The extraction module (1240) is configured to extract geometry information of each panoramic image. The geometry information can be transmitted to the encoders (1230) through bitstream (1227). The encoders (1230) are configured to generate a 3D shape (or Manhattan layout) of the scene based on the geometry information and semantic information of each panoramic image. For example, the encoders (1230) can generate a respective layout estimation (or a polygon) of the scene based on each panoramic image. The layout estimations of the panoramic images can be fused to form a final layout estimation (or a final polygon). The 3D shape of the scene can be generated by triangulating the final polygon, quadrangulating the final polygon, generating point clouds based on the final polygon, or voxelizing the final polygon.

In the FIG. 12 example, the bitstream (1245) is provided to the video decoder (1250). The video decoder (1250) includes decoders (1260) and a reconstruction module (1290) that are coupled together as shown in FIG. 12. In an example, the decoders (1260) correspond to the encoders (1230) and can decode the bitstream (1245) that is encoded by the encoder (1230) and generate decoded information (1265). The decoded information (1265) can further be provided to the reconstruction module (1290). The reconstruction module (1290) can accordingly reconstruct the 3D shape (or Manhattan layout) (1295) of the scene based on the decoded information (1265).

Figure 13:
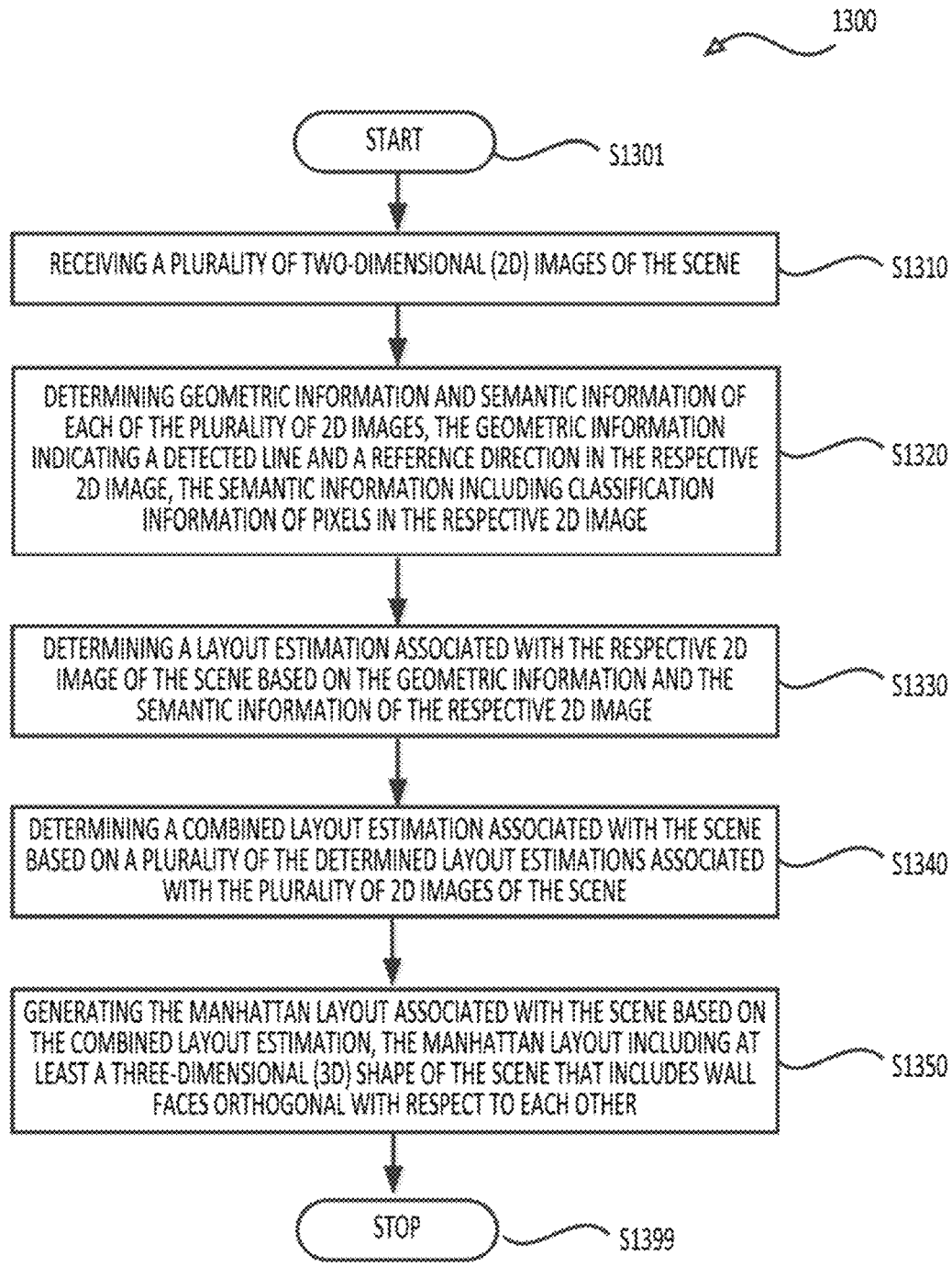
FIG. 13 shows a flow chart outlining a process of estimating a Manhattan layout associated with a scene in some examples.

FIG. 13 shows a flow chart outlining a process (1300) according to an embodiment of the disclosure. In various embodiments, the process (1300) is executed by processing circuitry. In some embodiments, the process (1300) is implemented in software instructions, thus when the processing circuitry executes the software instructions, the processing circuitry performs the process (1300). The process starts at (S1301) and proceeds to (S1310).

At (S1310), a plurality of two-dimensional (2D) images of the scene is received.

At (S1320), geometric information and semantic information of each of the plurality of 2D images is determined. The geometric information indicates a detected line and a reference direction in the respective 2D image. The semantic information includes classification information of pixels in the respective 2D image.

At (S1330), a layout estimation associated with the respective 2D image of the scene is determined based on the geometric information and the semantic information of the respective 2D image.

At (S1340), a combined layout estimation associated with the scene is determined based on a plurality of the determined layout estimations associated with the plurality of 2D images of the scene.

At (S1350), the Manhattan layout associated with the scene is generated based on the combined layout estimation. The Manhattan layout includes at least a three-dimensional (3D) shape of the scene that includes wall faces orthogonal with respect to each other.

To determine the geometric information and the semantic information, first geometric information of a first 2D image of the plurality of 2D images can be extracted. The first geometric information can include at least one of detected lines, reference directions of the first 2D image, a ratio of a first distance from a ceiling to a ground and a second distance from a camera to the ground, or a relative pose (e.g., angle or distance) between the first 2D image and a second 2D image of the plurality of 2D images. Pixels of the first 2D image can be labelled to generate first semantic information, where the first semantic information can indicate first structure information of the pixels in the first 2D image.

To determine the layout estimation associated with the respective 2D image of the scene, a first layout estimation of the plurality of the determined layout estimations associated with the scene can be determined based on the first geometric information and the first semantic information of the first 2D image. To determine the first layout estimation, whether each of the detected lines is a borderline that corresponds to a wall border in the scene can be determined. The borderlines of the detected lines can be aligned with the reference directions of the first 2D image. A first polygon that indicates the first layout estimation can be generated based on the aligned borderlines with one of a 2D polygon denoising and a staircase removal.

To generate the first polygon, a plurality of incomplete borderlines of the borderlines can be completed based on one of (i) estimating the plurality of incomplete borderlines based on a combination of a ceiling borderline and a floor borderline of the borderlines, and (ii) connecting a pair of incomplete borderlines of the plurality of incomplete borderlines. The pair of incomplete borderlines can be connected based on one of (i) adding a perpendicular line to the pair of incomplete borderlines in response to the pair of incomplete borderlines being parallel and (ii) extending at least one of the pair of incomplete borderlines such that an intersection of the pair of incomplete borderlines is positioned on the extended pair of incomplete borderlines.

To determine the combined layout estimation associated with the scene, a base polygon can be determined by combining a plurality of polygons via a polygon union algorithm. Each of the plurality of polygons can correspond to a respective layout estimation of the plurality of the determined layout estimations. A shrunk polygon can be determined based on the base polygon. The shrunk polygon can include updated edges that are updated from edges of the base polygon. A final polygon can be determined based on the shrunk polygon with one of the 2D polygon denoising and the staircase removal. The final polygon can correspond to the combined layout estimation associated with the scene.

To determine the shrunk polygon, a plurality of candidate edges can be determined from the plurality of polygons for the edges of the base polygon. Each of the plurality of candidate edges can correspond to a respective edge of the base polygon. The updated edges of the shrunk polygon can be generated by replacing one or more edges of the base polygon with the corresponding one or more candidate edges in response to the one or more candidate edges being closer to original view positions in the plurality of 2D images than the corresponding one or more edges of the base polygon.

In some embodiments, each of the plurality of candidate edges can be parallel to the corresponding edge of the base polygon. A projected overlapping portion between the respective candidate edge and the corresponding edge of the base polygon can be larger than a threshold.

To determine the combined layout estimation associated with the scene, an edge set that includes edges of the final polygon can be determined. A plurality of edge groups can be generated based on the edge set. A plurality of internal edges of the final polygon can be generated. The plurality of internal edges can be indicated by a plurality of average edges of one or more edge groups of the edge set. Each of the one or more edge groups of the plurality of edge groups can include a respective number of edges that is greater than a target value. Each of the plurality of average edges can be obtained by averaging edges of a respective one of the one or more edge groups.

In some embodiments, the plurality of edge groups can include a first edge group. The first edge group can further include a first edge and a second edge. The first edge and the second edge can be parallel. A distance between the first edge and the second edge can be less than a first threshold. A projected overlapping region between the first edge and the second edge can be greater than a second threshold.

To generate the Manhattan layout associated with the scene, the Manhattan layout associated with the scene can be generated based on one of triangle meshes triangulated from the combined layout estimation, quadrilateral meshes quadrangulated from the combined layout estimation, sampling points sampled from one of the triangle meshes and the quadrilateral meshes, or discrete grids generated from one of the triangle meshes and the quadrilateral meshes via voxelization.

In some embodiments, the Manhattan layout associated with the scene can be generated based on the triangle meshes triangulated from the combined layout estimation. Accordingly, to generate the Manhattan layout associated with the scene, a ceiling face and a floor face in the scene can be generated by triangulating the combined layout estimation. The wall faces in the scene can be generated by triangulating rectangles that surround a ceiling borderline and a floor borderline in the scene. Textures of the Manhattan layout associated with the scene can be generated via a ray-casting based process.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
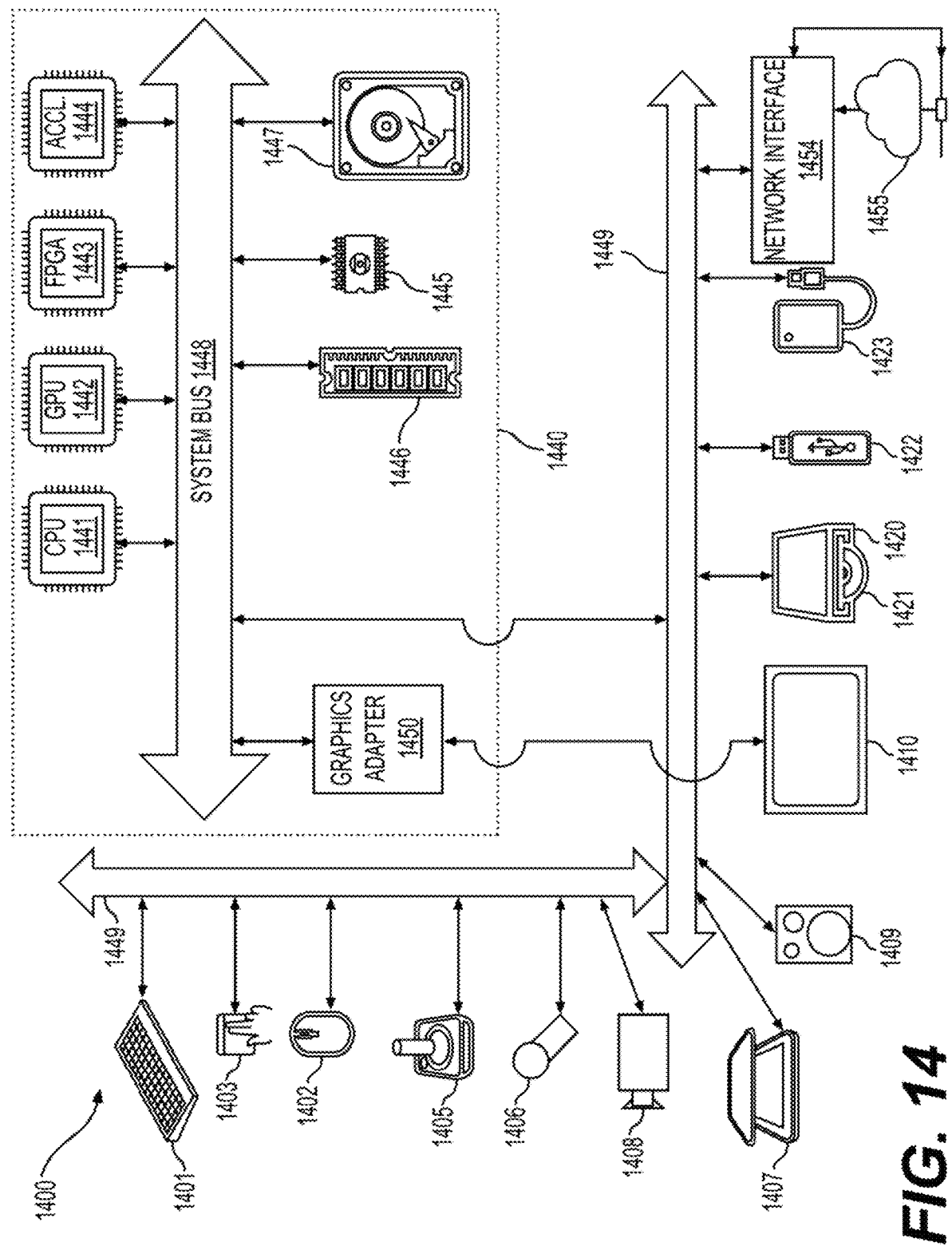
FIG. 14 is a schematic illustration of a computer system in some examples.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for estimating a Manhattan layout associated with a scene, the method comprising:

receiving a plurality of two-dimensional (2D) images of the scene;

determining geometric information and semantic information of each of the plurality of 2D images, the geometric information indicating a detected line and a reference direction in the respective 2D image, the semantic information including classification information of pixels in the respective 2D image;

determining a plurality of layout estimations associated with the plurality of 2D images of the scene, each layout estimation being associated with the respective 2D image of the scene based on the geometric information and the semantic information of the respective 2D image;

determining a combined layout estimation associated with the scene based on a shrunk polygon that is generated based on a plurality of candidate edges, the shrunk polygon being a portion of a base polygon, the base polygon being formed by combining the plurality of the determined layout estimations associated with the plurality of 2D images of the scene, which one of the plurality of candidate edges is selected for the shrunk polygon being determined based on whether (i) the one of the plurality of candidate edges is parallel to a corresponding edge of the base polygon, (ii) a projected overlapping portion between the one of the plurality of candidate edges and the corresponding edge of the base polygon is larger than a threshold, and (iii) the one of the plurality of candidate edges is closer to an original view position associated with a corresponding 2D image than the corresponding edge of the base polygon; and generating the Manhattan layout associated with the scene based on the combined layout estimation, the Manhattan layout including at least a three-dimensional (3D) shape of the scene that includes wall faces orthogonal with respect to each other.

2. The method of claim 1, wherein the determining the geometric information and the semantic information further comprises:

extracting first geometric information of a first 2D image of the plurality of 2D images, the first geometric information including at least one of detected lines, reference directions of the first 2D image, a ratio of a first distance from a ceiling to a ground and a second distance from a camera to the ground, or a relative pose between the first 2D image and a second 2D image of the plurality of 2D images; and labeling pixels of the first 2D image to generate first semantic information, the first semantic information indicating first structure information of the pixels in the first 2D image.

3. The method of claim 2, wherein the determining the layout estimation associated with the respective 2D image of the scene further comprises:
  determining a first layout estimation of the plurality of the determined layout estimations associated with the scene based on the first geometric information and the first semantic information of the first 2D image; and
  the determining the first layout estimation further comprises:
    determining whether each of the detected lines is a borderline that corresponds to a wall border in the scene;
    aligning the borderlines of the detected lines with the reference directions of the first 2D image; and
    generating a first polygon that indicates the first layout estimation based on the aligned borderlines with one of a 2D polygon denoising and a staircase removal.

4. The method of claim 3, wherein the generating the first polygon further comprises completing a plurality of incomplete borderlines of the borderlines based on one of:
  estimating the plurality of incomplete borderlines based on a combination of a ceiling borderline and a floor borderline of the borderlines; and
  connecting a pair of incomplete borderlines of the plurality of incomplete borderlines based on one of (i) adding a perpendicular line to the pair of incomplete borderlines when the pair of incomplete borderlines are parallel and (ii) extending at least one of the pair of incomplete borderlines such that an intersection of the pair of incomplete borderlines is positioned on the extended pair of incomplete borderlines.

5. The method of claim 3, wherein the determining the combined layout estimation associated with the scene further comprises:
  determining the base polygon by combining a plurality of polygons via a polygon union algorithm, each of the plurality of polygons corresponding to a respective layout estimation of the plurality of the determined layout estimations;
  determining the shrunk polygon based on the base polygon, the shrunk polygon including updated edges that are updated from edges of the base polygon; and
  determining a final polygon based on the shrunk polygon with one of the 2D polygon denoising and the staircase removal, the final polygon corresponding to the combined layout estimation associated with the scene.

6. The method of claim 5, wherein the determining the shrunk polygon further comprises:
  determining the plurality of candidate edges from the plurality of polygons for the edges of the base polygon, each of the plurality of candidate edges corresponding to a respective edge of the base polygon; and
  generating the updated edges of the shrunk polygon by replacing one or more edges of the base polygon with the corresponding one or more candidate edges when the one or more candidate edges are closer to original view positions in the plurality of 2D images than the corresponding one or more edges of the base polygon.

7. The method of claim 5, wherein the determining the combined layout estimation associated with the scene further comprises:
  determining an edge set that includes edges of the final polygon;
  generating a plurality of edge groups based on the edge set; and
  generating a plurality of internal edges of the final polygon that is indicated by a plurality of average edges of one or more edge groups of the edge set, each of the one or more edge groups of the plurality of edge groups including a respective number of edges that is greater than a target value, each of the plurality of average edges being obtained by averaging edges of a respective one of the one or more edge groups.

8. The method of claim 7, wherein:
  the plurality of edge groups includes a first edge group, and
  the first edge group further includes a first edge and a second edge, the first edge and the second edge being parallel, a distance between the first edge and the second edge being less than a first threshold, and a projected overlapping region between the first edge and the second edge being greater than a second threshold.

9. The method of claim 1, wherein the generating the Manhattan layout associated with the scene further comprises:
  generating the Manhattan layout associated with the scene based on one of triangle meshes triangulated from the combined layout estimation, quadrilateral meshes quadrangulated from the combined layout estimation, sampling points sampled from one of the triangle meshes and the quadrilateral meshes, or discrete grids generated from one of the triangle meshes and the quadrilateral meshes via voxelization.

10. The method of claim 9, wherein:
  the Manhattan layout associated with the scene is generated based on the triangle meshes triangulated from the combined layout estimation, and
  the generating the Manhattan layout associated with the scene further comprises:
    generating a ceiling face and a floor face in the scene by triangulating the combined layout estimation;
    generating the wall faces in the scene by triangulating rectangles that surround a ceiling borderline and a floor borderline in the scene; and
    generating textures of the Manhattan layout associated with the scene via a ray-casting based process.

11. An apparatus for estimating a Manhattan layout associated with a scene, the apparatus comprising:
  processing circuitry configured to:
    receive a plurality of two-dimensional (2D) images of the scene;
    determine geometric information and semantic information of each of the plurality of 2D images, the geometric information indicating a detected line and a reference direction in the respective 2D image, the semantic information including classification information of pixels in the respective 2D image;
    determine a plurality of layout estimations associated with the plurality of 2D images of the scene, each layout estimation being associated with the respective 2D image of the scene based on the geometric information and the semantic information of the respective 2D image;
    determine a combined layout estimation associated with the scene based on a shrunk polygon that is generated based on a plurality of candidate edges, the shrunk polygon being a portion of a base polygon, the base polygon being formed by combining the plurality of the determined layout estimations associated with the plurality of 2D images of the scene, which one of the plurality of candidate edges is selected for the shrunk polygon being determined based on whether (i) the one of the plurality of candidate edges is parallel to a corresponding edge of the base polygon, (ii) a projected overlapping portion between the one of the plurality of candidate edges and the corresponding edge of the base polygon is larger than a threshold, and (iii) the one of the plurality of candidate edges is closer to an original view position associated with a corresponding 2D image than the corresponding edge of the base polygon; and generate the Manhattan layout associated with the scene based on the combined layout estimation, the Manhattan layout including at least a three-dimensional (3D) shape of the scene that includes wall faces orthogonal with respect to each other.

12. The apparatus of claim 11, wherein the processing circuitry is configured to:

extract first geometric information of a first 2D image of the plurality of 2D images, the first geometric information including at least one of detected lines, reference directions of the first 2D image, a ratio of a first distance from a ceiling to a ground and a second distance from a camera to the ground, or a relative pose between the first 2D image and a second 2D image of the plurality of 2D images; and label pixels of the first 2D image to generate first semantic information, the first semantic information indicating first structure information of the pixels in the first 2D image.

13. The apparatus of claim 12, wherein the processing circuitry is configured to:

determine a first layout estimation of the plurality of the determined layout estimations associated with the scene based on the first geometric information and the first semantic information of the first 2D image; and to determine the first layout estimation, the processing circuitry is further configured to:

determine whether each of the detected lines is a borderline that corresponds to a wall border in the scene;

align the borderlines of the detected lines with the reference directions of the first 2D image; and generate a first polygon that indicates the first layout estimation based on the aligned borderlines with one of a 2D polygon denoising and a staircase removal.

14. The apparatus of claim 13, wherein the processing circuitry is configured to:

complete a plurality of incomplete borderlines of the borderlines based on one of:

estimating the plurality of incomplete borderlines based on a combination of a ceiling borderline and a floor borderline of the borderlines; and connecting a pair of incomplete borderlines of the plurality of incomplete borderlines based on one of (i) adding a perpendicular line to the pair of incomplete borderlines when the pair of incomplete borderlines are parallel and (ii) extending at least one of the pair of incomplete borderlines such that an intersection of the pair of incomplete borderlines is positioned on the extended pair of incomplete borderlines.

15. The apparatus of claim 13, wherein the processing circuitry is configured to:

determine the base polygon by combining a plurality of polygons via a polygon union algorithm, each of the plurality of polygons corresponding to a respective layout estimation of the plurality of the determined layout estimations;

determine the shrunk polygon based on the base polygon, the shrunk polygon including updated edges that are updated from edges of the base polygon; and determine a final polygon based on the shrunk polygon with one of the 2D polygon denoising and the staircase removal, the final polygon corresponding to the combined layout estimation associated with the scene.

16. The apparatus of claim 15, wherein the processing circuitry is configured to:

determine the plurality of candidate edges from the plurality of polygons for the edges of the base polygon, each of the plurality of candidate edges corresponding to a respective edge of the base polygon; and generate the updated edges of the shrunk polygon by replacing one or more edges of the base polygon with the corresponding one or more candidate edges when the one or more candidate edges are closer to original view positions in the plurality of 2D images than the corresponding one or more edges of the base polygon.

17. The apparatus of claim 15, wherein the processing circuitry is configured to:

determine an edge set that includes edges of the final polygon;

generate a plurality of edge groups based on the edge set; and generate a plurality of internal edges of the final polygon that is indicated by a plurality of average edges of one or more edge groups of the edge set, each of the one or more edge groups of the plurality of edge groups including a respective number of edges that is greater than a target value, each of the plurality of average edges being obtained by averaging edges of a respective one of the one or more edge groups.

18. The apparatus of claim 17, wherein:

the plurality of edge groups includes a first edge group, and the first edge group further includes a first edge and a second edge, the first edge and the second edge being parallel, a distance between the first edge and the second edge being less than a first threshold, and a projected overlapping region between the first edge and the second edge being greater than a second threshold.

19. The apparatus of claim 18, wherein the processing circuitry is configured to:

generate the Manhattan layout associated with the scene based on one of triangle meshes triangulated from the combined layout estimation, quadrilateral meshes quadrangulated from the combined layout estimation, sampling points sampled from one of the triangle meshes and the quadrilateral meshes, or discrete grids generated from one of the triangle meshes and the quadrilateral meshes via voxelization.

20. The apparatus of claim 19, wherein:

the Manhattan layout associated with the scene is generated based on the triangle meshes triangulated from the combined layout estimation, and to generate the Manhattan layout associated with the scene, the processing circuitry is configured to:

generate a ceiling face and a floor face in the scene by triangulating the combined layout estimation;

generate the wall faces in the scene by triangulating rectangles that surround a ceiling borderline and a floor borderline in the scene; and generate textures of the Manhattan layout associated with the scene via a ray-casting based process.

* * * * *